(12) United States Patent
Furumi et al.

(10) Patent No.: US 6,223,851 B1
(45) Date of Patent: May 1, 2001

(54) REAR WHEEL STEERING DEVICE HAVING FAIL-SAFE FEATURES

(75) Inventors: Hiroshi Furumi; Kunio Shirakawa; Yoshio Kakizaki, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/344,775

(22) Filed: Jun. 28, 1999

(30) Foreign Application Priority Data

Jun. 29, 1998 (JP) ................................................. 10-182108
Jun. 29, 1998 (JP) ................................................. 10-182114
Jun. 29, 1998 (JP) ................................................. 10-182116
Jun. 16, 1999 (JP) ................................................. 11-169605
Jun. 16, 1999 (JP) ................................................. 11-169609
Jun. 18, 1999 (JP) ................................................. 11-172581

(51) Int. Cl.[7] ............................................................. B62D 5/04
(52) U.S. Cl. .......................................... 180/445; 180/404
(58) Field of Search .................................... 180/404, 412, 180/413, 443, 444, 445

(56) References Cited

U.S. PATENT DOCUMENTS 5,456,330 * 10/1995 Kojima et al. .
5,810,108 * 9/1998 Jung et al ............................ 180/404

FOREIGN PATENT DOCUMENTS 569834    3/1993  (JP) .
8301131  11/1996  (JP) .
958515    3/1997  (JP) .

* cited by examiner

*Primary Examiner*—Kevin Hurley
(74) *Attorney, Agent, or Firm*—Carrier, Blackman & Associates, P.C.; Joseph P. Carrier; William D. Blackman

(57) ABSTRACT

Provided is a rear wheel steering device which includes a rotary shaft having a pair of threaded sections of mutually opposite senses, and a pair of slide members supported in a rotationally fast manner, and having threaded sections which engage the corresponding threaded sections of the rotary shaft so as to be moveable in mutually opposite axial directions as the rotary shaft is turned in either direction, and a pair of clutch units each interposed between a corresponding one of the slide members and the slide shaft for selectively coupling them in an axially fast manner. Thus, the steering direction can be determined by selectively engaging either one of the clutch units, and the magnitude of the steering angle can be determined by turning the rotary shaft with an electric motor in either direction. In particular, when it is desired to bring the steering device to the neutral position, it can be achieved simply by turning the electric motor in a prescribed direction without regard to the current state of the steering device.

17 Claims, 15 Drawing Sheets

REAR WHEEL STEERING DEVICE HAVING FAIL-SAFE FEATURES

TECHNICAL FIELD

The present invention relates to a rear wheel steering device which is driven by an electric motor, and in particular to a rear wheel steering device which is provided with means for reliably restoring and firmly retaining a neutral position.

BACKGROUND OF THE INVENTION

Various proposals have been made in regard to the technology of front and rear wheel steering devices which improve the handling of the vehicle by steering the rear wheels in a certain relationship to the front wheel steering angle (Japanese patent laid open publication No. 9-58515). Such a front and rear wheel steering device is typically incorporated with a fail-safe device for automatically restoring the steering angle to the neutral position (straight ahead position) in case of a failure of the steering sensor (or upon stopping the engine).

According to a known fail-safe device, a return spring is used for forcing the steering rod back to the neutral position when a normal steering angle control is not possible (see Japanese patent laid open publication No. 8-301131, for instance).

However, according to this conventional device, because the steering rod is constantly subjected to the spring force of a return spring which is powerful enough to restore the steering to the neutral position and allow the vehicle to move straight ahead even when the steering sensor has failed and it is no longer possible to determine the neutral position, the motor for producing the steering angle must be powerful enough to oppose the spring force of the return spring in addition to overcoming the resistance from the road surface. This factor has prevented a compact design of the electric motor and the drive circuit for the motor.

Japanese patent laid open publication No. 5-69834 discloses an arrangement which comprises a primary and secondary drive units, and clutches for selectively coupling the drive units to the steering device so that the rear wheel steering angle may be restored to the neutral position with the secondary steering device in case of a failure of the primary steering device. However, the steering angle sensor must be able to determine the neutral position at all times, and the need for the secondary drive unit which is needed only at the time of a failure undesirably adds to the size of the overall system.

BRIEF SUMMARY OF THE INVENTION

In view of such problems of the prior art, a primary object of the present invention is to provide a rear wheel steering device which is capable of restoring the neutral position at the time of a failure in a reliable manner without increasing the size of the overall system.

A second object of the present invention is to provide a rear wheel steering device which is capable of maintaining the neutral position both accurately and firmly.

A third object of the present invention is to provide a rear wheel steering device which is reliable in operation, and simple in structure.

According to the present invention, these and other objects of the present invention can be accomplished by providing a rear wheel steering device, comprising: a slide shaft supported by a casing so as to be axially slidable; a rotary shaft supported by the casing in parallel with the slide shaft so as to be rotatable around its axial line, and provided with a pair of threaded sections of mutually opposite senses; an electric motor adapted to turn the rotary shaft in either direction; a pair of slide members supported in a rotationally fast manner, and having threaded sections which engage the corresponding threaded sections of the rotary shaft so as to be moveable in mutually opposite axial directions as the rotary shaft is turned in either direction; a pair of clutch units each interposed between a corresponding one of the slide members and the slide shaft for selectively coupling them in an axially fast manner; and at least one actuator for selectively engaging either one of the clutch units.

Thus, the steering direction can be determined by selectively engaging either one of the clutch units, and the magnitude of the steering angle can be determined by turning the rotary shaft with the electric motor in either direction. In particular, when it is desired to bring the steering device to the neutral position, it can be achieved simply by turning the electric motor in a prescribed direction without regard to the current state of the steering device. This is particularly beneficial when the restoration of the neutral position is required as a fail-safe measure in case of a failure for monitoring the state of the steering device because the device is unable to properly monitor the state of the steering device at such a time. Also, this device does not require a spring member or the like which constantly applies a load to the steering device for restoring the neutral position in case of a device failure so that the resulting reduction in the load acting on the motor reduces the required capacity of the output of the electric motor.

The slide shaft may be provided with a projection which is adapted to be held between the slide members when the slide members are moved axially toward each other as a preferred arrangement for forcing the slide shaft to the neutral position. In particular, if the casing comprises a projection which is adapted to be held between the slide members when the slide members are moved axially toward each other, jointly with the projection provided in the slide shaft, so as to firmly define a neutral position for the slide shaft, the neutral position can be accurately defined, and, once the neutral position is retained, can be held in a highly firm fashion.

The slide members may consist of a sleeve member fitted onto the slide shaft so that the device may have a mechanically durable structure, and capable of a stable operation. According to a preferred embodiment of the present invention adapted to the use of such sleeve members, each of the clutch units may comprise a clutch inner which is attached to the slide shaft and a clutch outer which is attached to a corresponding one of the slide members so as to be respectively axially fast but relatively rotatable by a prescribed angle, each of the clutch units comprising a spring member which relatively urges the clutch outer and the clutch inner in an angular direction, the actuator being adapted to relatively turn the clutch outer and the clutch inner in an opposite angular direction against a biasing force of the spring member; the clutch outer and the clutch inner being provided with radial projections which selectively allow transmission of an axially outward movement of a corresponding one of the slide members to the slide shaft depending on an angular position of the clutch outer relative to the clutch inner.

The steering device may be formed in various forms. For instance, it can be constructed as a parallel-shaft arrangement, in which the rotary shaft comprises a threaded rod rotatably supported by the casing next to the slide shaft, and having a pair of threaded sections of opposite senses on either side of an axially central part thereof, each of the slide members including a first annular part having an internal thread engaging a corresponding one of the threaded sections of the threaded rod and a second annular part fitted onto the slide shaft with the clutch unit interposed between them.

Once the slide members have moved away from the neutral position, it is essential that the applicable clutch unit is kept engaged for the steering device to operate properly, in particular to regain the neutral position. As a measure against the failure of the actuator for selectively engaging the clutch and/or as a measure for eliminating the need for keeping the actuator energized at all times except for when the steering device is at the neutral position, it is preferably to provide means for keeping one of the clutches engaged after the slide members have left the neutral position. As a preferred arrangement for achieving this, the clutch inner may be rotatable relative to the slide shaft, and provided with an arm which is engaged in a groove formed in the casing, the groove including a pair of axial segments corresponding to positions of the arm when the clutch unit is engaged and disengaged, respectively, which are joined by a circumferential segment connecting adjacent axial ends of the axial segments and corresponding to the neutral position of the slide shaft so that an angular position of the clutch inner may be maintained even in absence of energization of the actuator for the clutch unit once the slide member is moved axially away from the neutral position in a corresponding direction.

The actuator for selectively engaging the clutches may consist of a pair of solenoids each of which acts upon an arm formed on a corresponding one of the clutch inners. Because the clutch units operate in a mutually exclusive manner or can each operate only when the other is not operating, it is possible to use only one solenoid or other actuator for controlling the clutch units. For instance, the actuator may consist of a single solenoid having a pair of working ends which alternatively act upon an arm formed on a selected one of the clutch inners, or consist of a rocker arm having two ends each of which acts upon an arm formed a corresponding one of the clutch inners, a spring member biasing the rocker arm in an angular direction, and a single solenoid which selectively biases the rocker arm in an opposite angular direction against a spring force of the spring member.

As an alternate emebodiment using a different arrangements for the clutch units, the rotary shaft may comprise a threaded rod rotatably supported by the casing next to the slide shaft, and having a pair of threaded sections of opposite senses on either side of an axially central part thereof, each of the slide members including an annular part having an internal thread engaging a corresponding one of the threaded sections of the rotary shaft; and each of the clutch units comprises a hole formed in a corresponding one of the slide members, a pin slidably received in the slide shaft so as to be selectively fitted into the hole of the slide member when the slide shaft and the slide member are at their neutral positions; a spring member which normally resiliently retracts the pin into the slide shaft; and an actuator which can selectively fit the pin into the hole of the slide member against a spring force of the spring member. In this case, as means for keeping one of the clutches engaged after the slide members have left the neutral position, the casing may be provided with a guide wall which engages each of the pins so as to keep the pin fitted into the hole of the corresponding one of the slide members as the slide shaft is axially driven by the slide member away from its neutral position with the pin fitted into the hole of the slide member.

To construct the steering device in a highly compact manner, and increase the mechanical durability of the device, a coaxial arrangement may be selected. For instance, the rotary shaft may comprise a hollow sleeve member having a pair of internal threaded sections of mutually opposite senses on an inner surface thereof in a mutually symmetric relationship with respect to an axial center thereof while the slide members comprise a pair of slide sleeves each having an external threaded section on an outer circumferential surface thereof which engages a corresponding one of the threaded sections of the rotary shaft in a coaxial relationship; the slide shaft being coaxially received in the slide sleeves. In this case, the hollow sleeve member serving as the rotary shaft may be rotatably supported by the casing, and provided with a gear or the like on its outer circumferential surface so that the rotative force may be conveniently transmitted from the electric motor to the rotary shaft. Also, each of the slide sleeves may comprise a radial projection which is received in an axial groove formed in the casing to keep the slide sleeve rotationally fast with respect to the casing.

In this coaxial arrangement, preferably, each of the clutch units comprises a clutch inner which is fixedly attached to slide shaft and provided with outwardly extending radial projections, a clutch outer which is attached to a corresponding one of the slide sleeves so as to be axially fast but relatively rotatable by a prescribed angle, and provided with an inwardly extending radial projections which selectively axially align with the projections of the clutch inner so as to engage the slide shaft axially fast with the slide sleeve depending a relative angle between them, and a spring member which normally urges the clutch outer in one angular direction; the actuator for the clutch unit being adapted to turn the clutch outer in an opposite angular direction against a spring force of the spring member.

So that an angular position of the clutch inner may be maintained even in absence of energization of actuator for the clutch unit once the slide member is moved axially away from the neutral position in a corresponding direction, the clutch outer may be rotatable relative to the slide shaft, and provided with an arm which is engaged in a groove formed in the casing, the groove including a pair of axial segments corresponding to positions of the arm when the clutch unit is engaged and disengaged, respectively, which are joined by a circumferential segment connecting adjacent axial ends of the axial segments and corresponding to the neutral position of the slide shaft so that an angular position of the clutch inner may be maintained even in absence of energization of the actuator for the clutch unit once the slide sleeve is moved axially away from the neutral position in a corresponding direction. In this case, the actuator may comprise a pair of rotary solenoids each of which acts upon an arm formed on a corresponding one of the clutch outers.

In this arrangement, if the clutch units both fail to engage, and the electric motor is turned at such a time, the slide sleeves move axially away from each other, and the position of the slide shaft becomes indeterminate. To avoid this from occurring, the slide sleeves may be provided with interlock projections on mutually opposing axial ends thereof so that the slide sleeves may be prevented from being moved axially apart from the neutral position when neither one of the clutch units is engaged. Thus, the interlock projections provide a failsafe feature for a case of the failure of both the clutch units to engage. If clutch units both fail to disengage, the electric motor is overloaded, and can be stopped by detecting such an over-current. The same thing happens if one of the clutch units is unable to disengage due to a failure, and the other clutch is engaged with the intention to move the slide shaft in a corresponding direction. Thus, in either situation, the steering device will be kept at the neutral position, and any undesired consequences can be avoided.

According to another embodiment of the present invention, the clutch unit may comprise a hole formed in the slide member, a pin slidably received in the slide shaft so as to be selectively fitted into the hole of the slide member when the slide shaft and the slide member are at their neutral positions; a spring member which normally resiliently retracts the pin into the slide shaft; and an actuator which can selectively fit the pin into the hole of the slide member against a spring force of the spring member. In this case, the retention of the engaged or disengaged state of the clutch unit when the corresponding slide member has left from the neutral position can be accomplished by providing a guide wall in the casing which engages the pin so as to keep the pin fitted into the hole of the slide member as the slide shaft is axially driven by the slide member away from its neutral position with the pin fitted into the hole of the slide member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
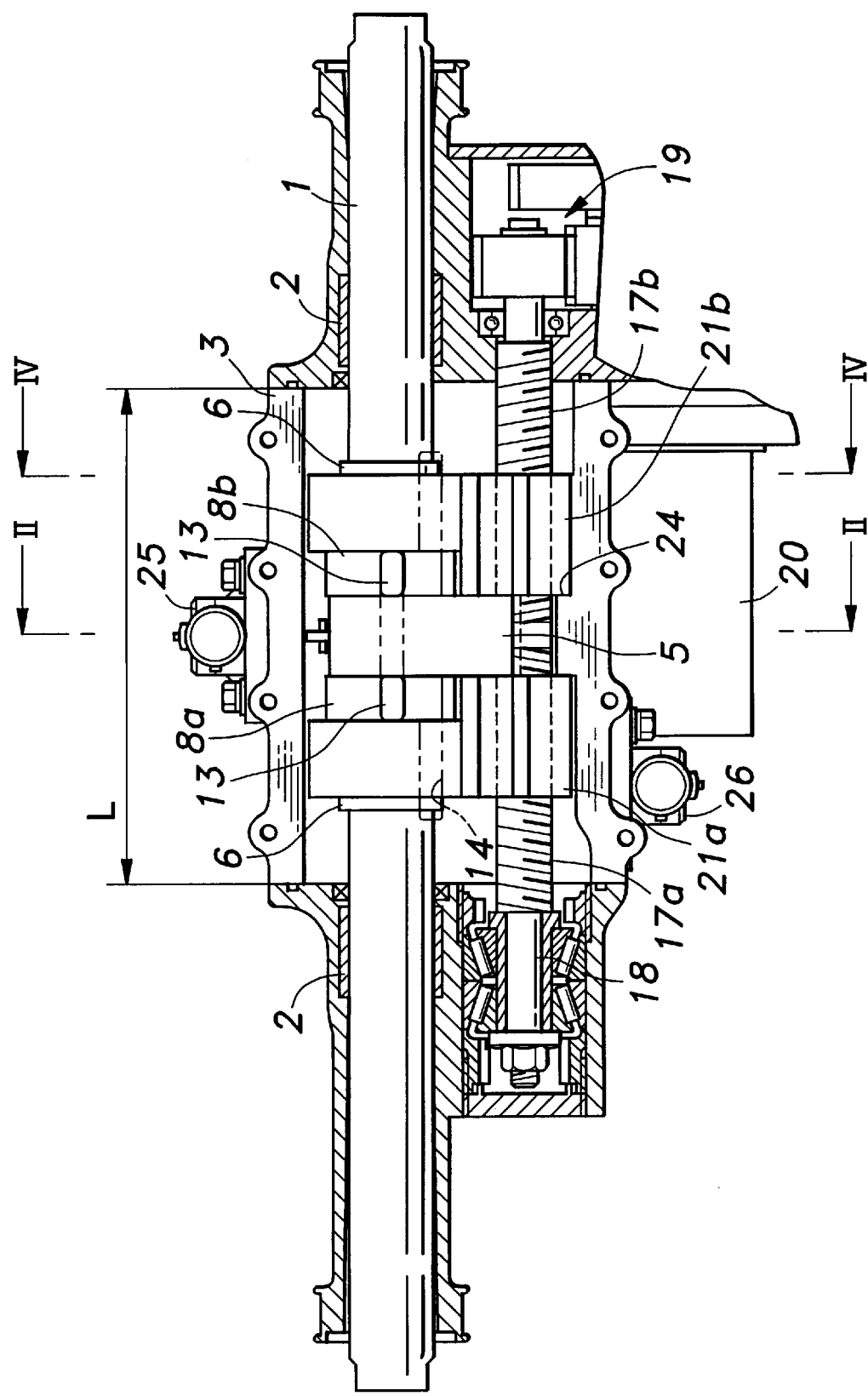
FIG. 1 is a sectional view of a first embodiment of the rear wheel steering device according to the present invention.

FIG. 1 generally illustrates the drive unit of an electric rear wheel steering system embodying the present invention. Referring to FIG. 1, a slide shaft 1 which is connected to the knuckle arms of the rear wheels via tie rods is supported by a casing 3 in an axially slidable manner via a slide bearing 2.

Figure 2:
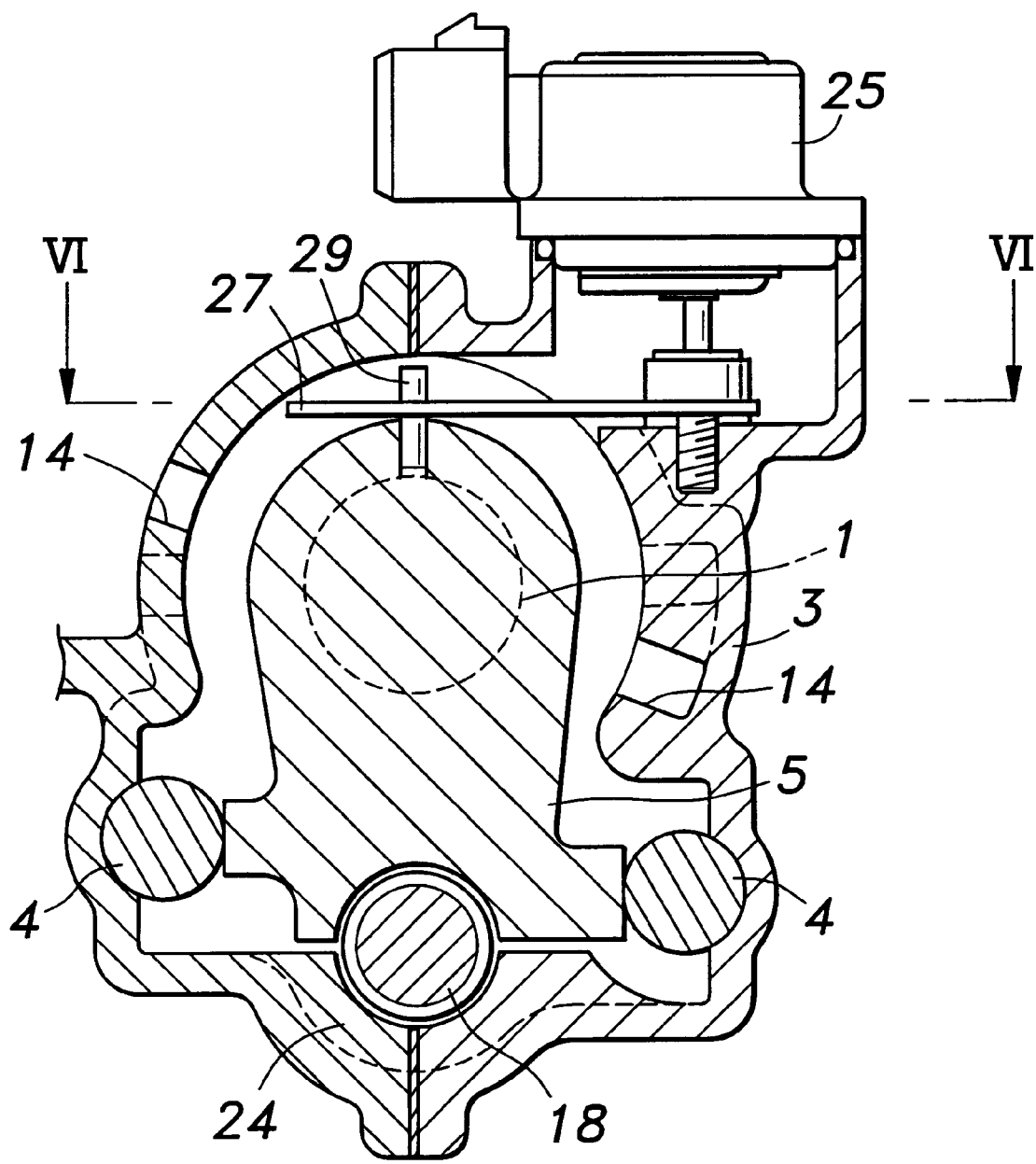
FIG. 2 is a sectional view taken along line II—II of FIG. 1.
Figure 3:
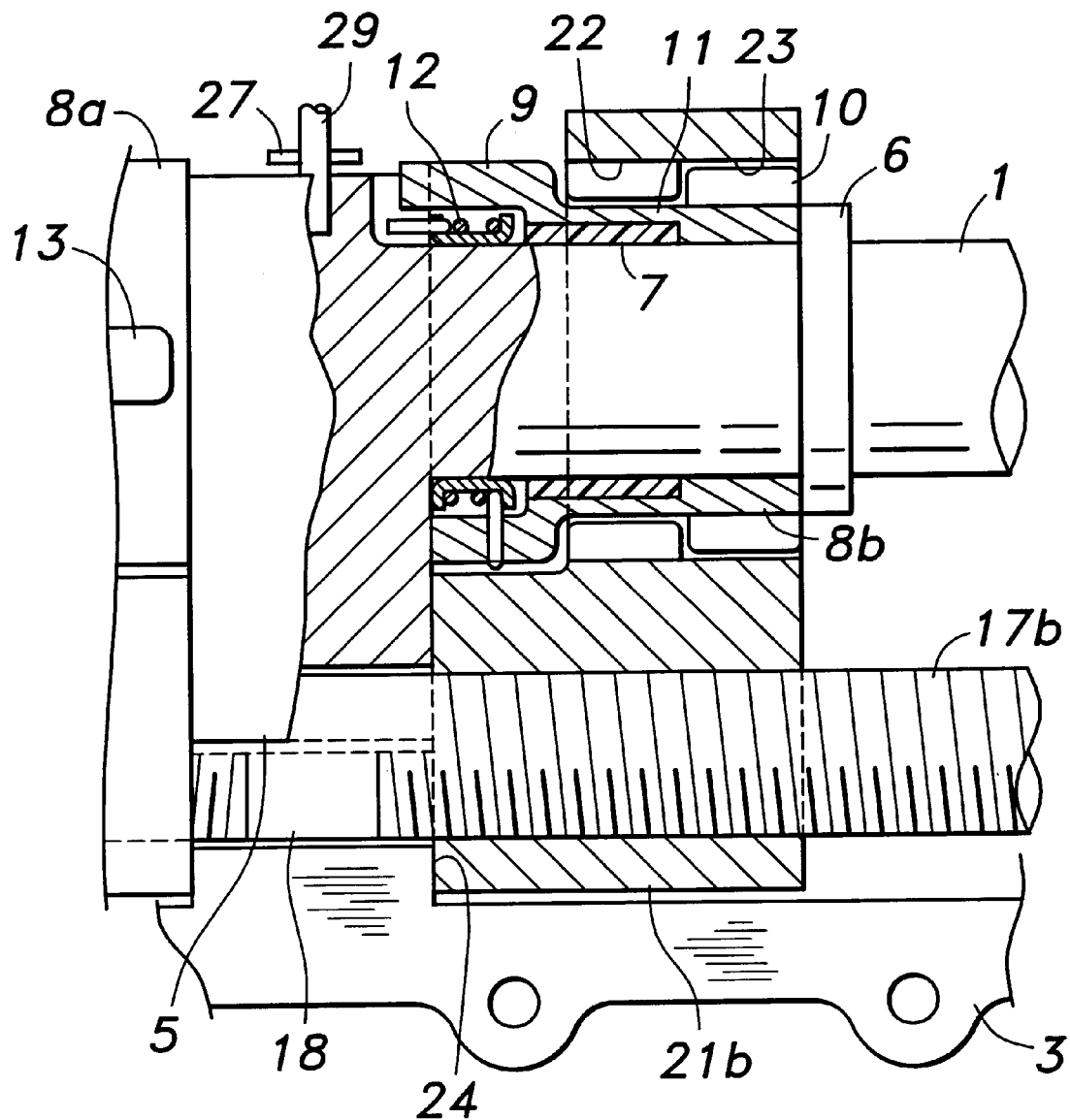
FIG. 3 is an enlarged fragmentary sectional view of a part of FIG. 1.
Figure 4:
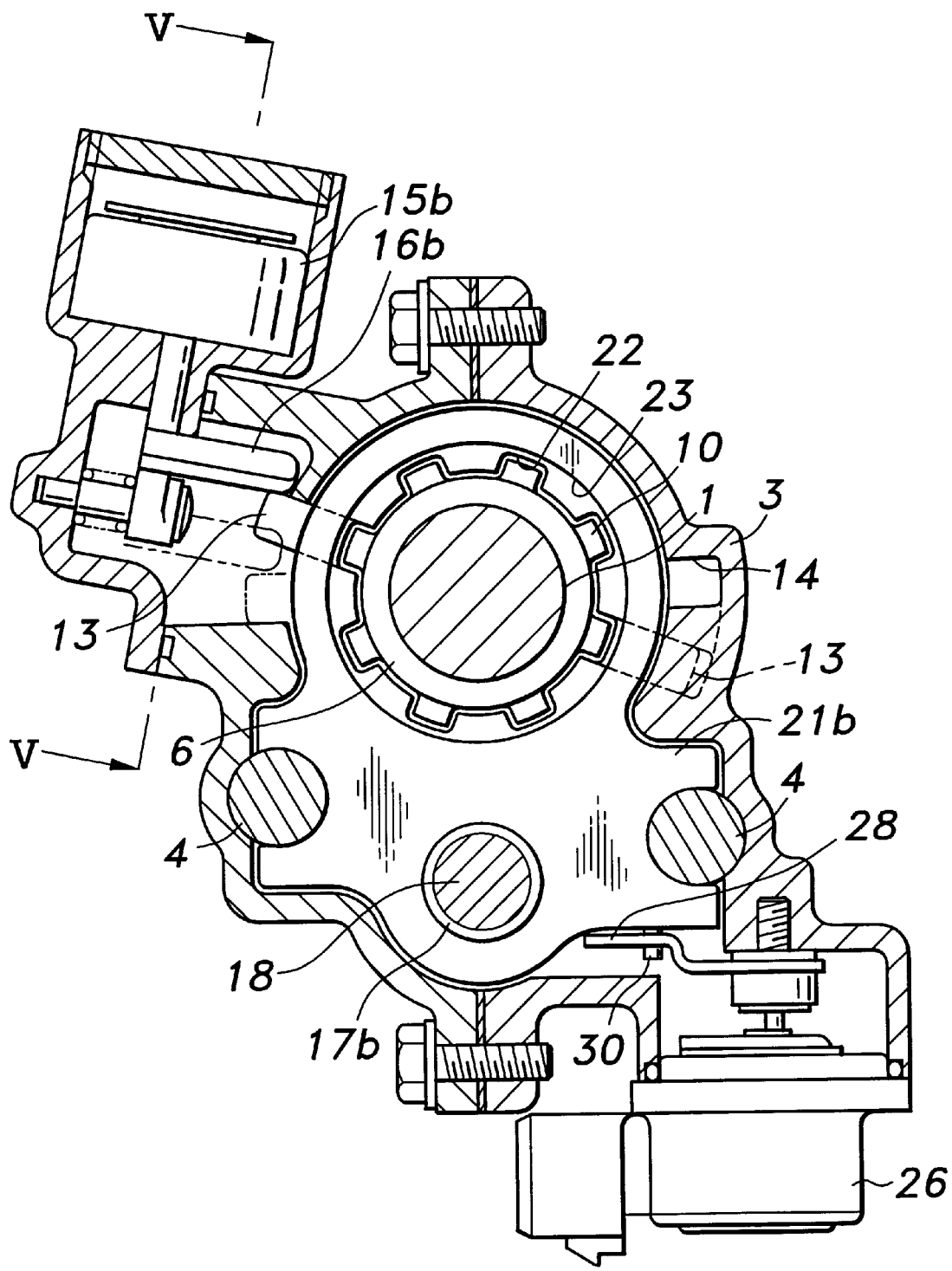
FIG. 4 is a sectional view taken along line IV—IV of FIG. 1

A radial projection 5 is formed in an axially middle part of the slide shaft 1 to prevent the rotation of the slide shaft 1 by engaging a pair of guide rods 4 extending in parallel with the slide shaft 1 and a rotary shaft 18 which is described hereinafter (see FIG. 2). A pair of clutch blocks 8a and 8b or tubular members are fitted on parts of the slide shaft 1 located on either side of the radial projection 5 as illustrated in FIGS. 3 and 4. The clutch blocks 8a and 8b are prevented from moving toward axial ends by ring members 6 which are laser welded to the slide shaft 1, and allowed to turn over a certain angular range via resin bearings 7.

The substantially tubular clutch blocks 8a and 8b are each provided with a large diameter portion 9 on a side adjacent to the radial projection 5 in the middle part of the slide shaft 1, and a plurality of rectangular projections 10 are provided on a side of each of the clutch blocks 8a and 8b remote from the large diameter portion (thereby substantially presenting a cross section of an external gear) along the periphery thereof at a regular interval, the tips of these projections 10 being aligned along a circle having a slightly smaller diameter than the inner diameter of the envelope circle of the recesses of the slide blocks 21a and 21b as described hereinafter. Additionally, a small diameter portion 11 is provided between the large diameter portion 9 and the projections 10 or in an axially middle part of each clutch block 8a or 8b, the small diameter portion having a diameter which is smaller than the diameter of the circle defined by the bottom surfaces of the projections 10. These clutch blocks 8a and 8b are each resiliently urged in one angular direction by a torsion coil spring 12 wound between the inner circumferential surface of the large diameter portion 9 and the outer circumferential surface of each slide block 21a or 21b.

Figure 5:
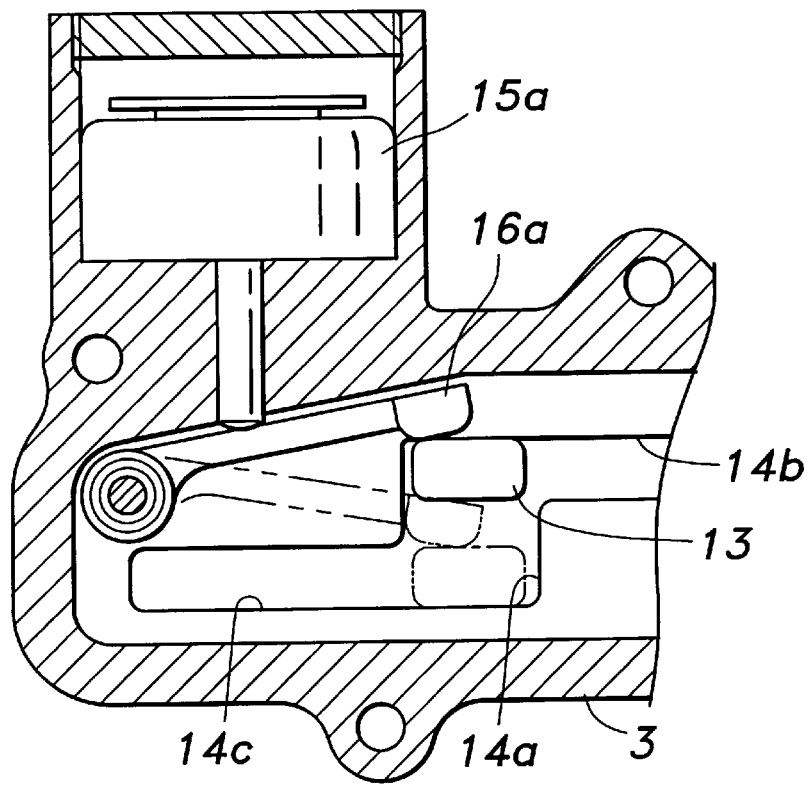
FIG. 5 is a fragmentary sectional view taken along line V—V of FIG. 4.

The large diameter portion 9 of each of the clutch blocks 8a and 8b is provided with a pair of arms 13 extending in diagonally opposing directions. The free ends of these arms 13 are received in guide grooves 14 which are formed on the inner surface of the casing 3 in a symmetric arrangement with one side thereof being crank-shaped as illustrated in FIG. 5. One of the arms 13 of each of the clutch blocks 8a and 8b is engaged by a free end of a corresponding one of a pair of rocker arms 16a and 16b which are actuated by corresponding electromagnetic linear actuators 15a and 15b so that the thrust of the electromagnetic linear actuators 15a and 15b is transmitted to the corresponding arms 13 via the rocker arms 16a and 16b to turn the clutch blocks 8a and 8b by a prescribed angle.

A rotary shaft 18 extending in parallel with the slide shaft 1 is supported by the casing 3 in a rotationally free but axially fast manner, and is provided with threaded sections 17a and 17b of mutually opposing senses on either side of an axially central part thereof. The rotary shaft 18 can be turned in a desired direction by an electric motor 20 via a reduction gear unit 19.

A pair of slide blocks 21a and 21b mesh with the corresponding threaded sections 17a and 17b of the rotary shaft 18 at symmetric positions relative to the axially central part of the rotary shaft 18. These slide blocks 21a and 21b are each integrally formed with a clutch block engaging bore 23 having a plurality of recesses 22 for engaging the projections 10 of the corresponding clutch block 8a or 8b. In other words, the clutch block engaging bores 23 are each formed like an internal gear. The slide blocks 21a and 21b are engaged by the guide rods 4 which retain the slide shaft 1 in a rotationally fast manner so as to maintain the clutch block engaging bores 23 coaxial with the slide shaft 1 at a high precision.

The recesses 22 formed in the clutch block engaging bores 23 of the slide blocks 21a and 21b correspond with the projections 10 formed around the outer circumferential surfaces of the clutch blocks 8a and 8b. When only the biasing force of the torsion coil springs 12 is applied to the rocker arms 16a and 16b or when the thrust force of the electromagnetic actuators 15a and 15b is not applied to the rocker arms 16a and 16b, the projections 10 and the recesses 22 align with each other.

The possible range of movement of the slide blocks 21a and 21b is determined by the axial distance L between the two opposing surfaces of the casing 3 so that the slide blocks 21a and 21b may be moveable by a distance corresponding to the maximum stroke of the slide shaft 1 for achieving a maximum steering angle of the rear wheels from a position in which an end surface of the corresponding slide block engages a stopper portion 24 formed in the casing 3 so as to have a same thickness as the axial dimension of the radial projection 5 formed in the axially central part of the slide shaft 1.

Now the mode of operation of the device of the present invention is described in the following with reference to FIG. 1 taking an example in the situation where the slide shaft 1 is moved leftward from its neutral position.

Although not shown in FIG. 1, the two clutch blocks 8a and 8b can be individually actuated in the angular direction by the different electromagnetic actuators 15a and 15b. Therefore, by activating only the left electromagnetic actuator 15a, only the left clutch block 8a is turned by an angle corresponding to the circumferential segment 14a of the guide groove 14 against the biasing force of the torsion spring 12. As a result, a phase difference is created between the projections 10 of the left clutch block 8a and the recesses 22 of the left slide block 21a in such a manner that the projections 10 of the left clutch block 8a align with the projections each flanked by the adjacent pair of the recesses 22 of the left slide block 21a.

When the electric motor 20 is turned in the normal direction under this condition, the two slide blocks 21a and 21b threaded with the rotary shaft 18 are moved away from each other by virtue of the mutually opposite senses of the two threaded sections 17a and 17b. This in turn causes the projections 10 of the left clutch block 8a to interfere with the left slide block 21a or the corresponding clutch to be engaged so that the leftward axial force acting on the left slide block 21a is transmitted to the slide shaft 1 via the left clutch block 8a.

Meanwhile, the projections 10 of the right clutch block 8b are in alignment with the recesses 22 of the right slide block 21b or the clutch is disengaged, the (rightward) movement of the right slide block 21b toward the shaft end would not affect the right clutch block 8b in any way. The arm 13 of the right clutch block 8b is received in the inwardly directed axial segment 14b of the guide groove 14. Thus, the slide shaft 1 can move leftward.

The slide shaft 1 then starts moving leftward, and the arm 13 of the left clutch block 8a eventually engages the outwardly directed axial segment 14c of the guide groove 14. As a result, the left clutch block 8a is held rotationally fast, and the engagement between the left clutch block 8a and the left slide block 21a is maintained even when the left electromagnetic actuator 15a is de-energized, and the rocker arm 16a has returned to the neutral position under the biasing force of the spring.

By selecting the lead angle of the threaded sections 17a and 17b of the rotary shaft 18 smaller than the friction angle, it is possible to maintain the steering angle at the value which was attained when the electric motor finally stopped.

When the electric motor 20 is reversed, the two slide blocks 21a and 21b move toward each other or toward the center so that the slide shaft 1 moves rightward toward the center this time by virtue of the engagement between the left slide block 21a and the radial projection 5 provided in the axially central part of the slide shaft 1. In this case also, because the projections 10 of the right clutch block 8b and the recesses 22 of the right slide block 21b are in alignment with each other (the clutch is disengaged), the (leftward) movement of the right slide block 21b toward the center would not affect the right clutch block 8b in any way.

If the left electromagnetic actuator 15a is already de-energized at the time when the arm 13 of the left clutch block 8a is aligned with the circumferential segment 14a of the guide groove 14 at the neutral position, the left clutch block 8a turns under the biasing force of the torsion spring 12 until the projections 10 of the left clutch block 8a and the recesses 22 of the left slide block 21a align with each other so that the left slide block 21 is disengaged from the slide shaft 1. In this neutral position, because the two slide blocks 21a and 21b hold the radial projection 5 of the slide shaft 1 between them along with the stopper portion 24 of the casing 3, combined with the function of the frictional angle of the threaded sections, the steering angle can be held at the neutral position at high precision in a highly rigid manner. Also, in this state, the arms 13 of the right and left clutch blocks 8a and 8b are located at the shoulders of the circumferential segments 14a of the corresponding guide grooves (see FIG. 5). Because this determines the axial positions of the right and left slide blocks 21a and 21b, the slide shaft 1 would be maintained at the neutral position even if the two slide blocks 21a and 21b moved for some reason.

When it is desired to move the slide shaft 1 rightward beyond the neutral position, only the right electromagnetic actuator 15b is energized at the neutral position while the electric motor 20 is turned in the normal direction. In this case, only the right clutch block 8b turns, and the rightward axial force of the right slide block 21b is transmitted to the slide shaft via the right clutch block 8b. At this time, because the left clutch block 8a and the left slide block 21a are disengaged from each other, the leftward movement of the left slide block 21a would not affect the slide shaft 1 in any way.

The steering direction can be determined by selectively energizing either one of the electromagnetic actuators 15a and 15b. The steering angle can be increased by turning the electric motor 20 in the normal direction and can be brought to the neutral position by turning the electric motor in the reverse direction. Therefore, it is not necessary to determine the steering direction when returning the steering angle to the neutral position. Also, once the neutral position has been attained, the slide blocks 21a and 21b are both engaged by the stopper portion 24 and the projection 5 of the slide shaft 1, and are prevented from moving any further, it is sufficient to shut off the electric current to the electric motor 20 by detecting an overload condition, and there is no need to detect that the neutral position has been attained.

The illustrated device comprises a first sensor 25 for detecting the lateral movement of the slide shaft 1 and a second sensor 26 for detecting the movement of one of the two slide blocks 21a and 21b, and abnormal conditions can be detected from the outputs of these sensors.

Figure 6:
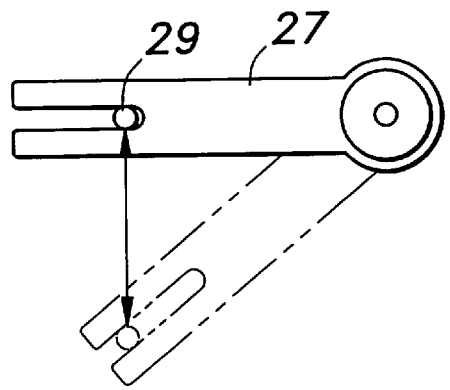
FIG. 6 is an end view taken along line VI—VI of FIG. 2.

These two sensors 25 and 26 may consist of rotary detectors such as potentiometers. Arms 27 and 28 are fixedly attached to the rotary shafts of the potentiometers, and the free ends of the arms 27 and 28 engage pins 29 and 30 which are attached to the slide shaft 1 and one of the slide blocks 21a so that the axial movements of the slide shafts 1 and the slide block 21a may be converted into rotary angles (see FIG. 6).

The occurrence of freezing or jamming may be required to be detected when the clutch units are engaged or when the slide blocks 21a and 21b are integrally joined with the slide shaft 1. If only one of the slide blocks 21a and 21b has frozen, the steering angle can be increased in one direction, but cannot be increased in the opposite direction because the engagement of one of the clutch units causes the other clutch unit to be engaged, and this keeps the slide shaft 1 immobile. Thus, it can be detected simply by monitoring the current to the electric motor 20 and/or the steering angle when an attempt is made to steer in either direction. If the slide blocks 21a and 21b have both frozen, as it is not possible to increase the steering angle in either direction, it can be detected simply by monitoring the current to the electric motor 20 and/or the steering angle when an attempt is made to steer in either direction.

The occurrence of failure to engage both of the clutch units can be detected by comparing the outputs of the first and second sensors 25 and 26 when an attempt is made to steer in either direction because the slide shaft 1 would not move even when either one of the slide blocks 21a and 21b is moved. The occurrence of failure to engage either one of the clutch units can be detected by comparing the outputs of the first and second sensors 25 and 26 when an attempt is made to steer in either direction because the steering angle can be increased in one direction but not in the other direction. In this case also, because the arms 13 of the right and left clutch blocks 8a and 8b are located in the shoulders of the circumferential segments 14a of the guide grooves, even when the two slide blocks 21a and 21b are moved apart from each other without engaging the clutch units, the neutral state of the slide shaft 1 is maintained.

In this manner, the freezing and the engagement failure of the clutch units can be determined from the steering condition without requiring any sensors for monitoring the operation of the electromagnetic actuators so that the structure of the device for determining system failures can be simplified.

Figure 7:
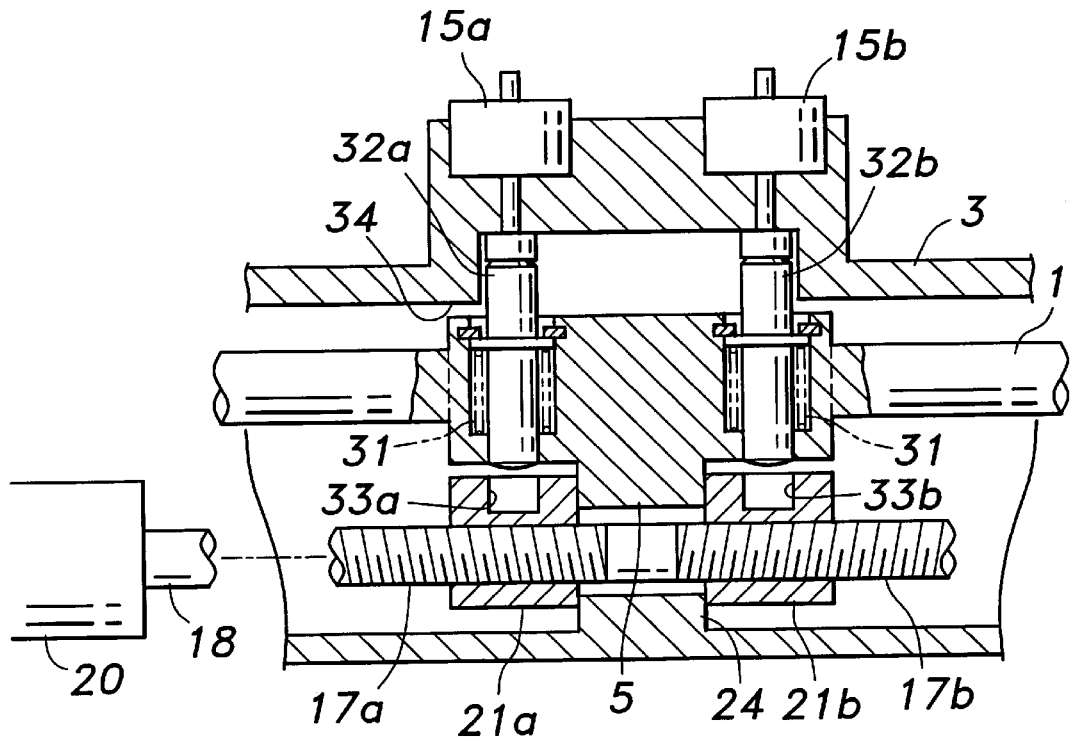
FIG. 7 is a fragmentary sectional view of an essential part of a second embodiment of the present invention.

FIG. 7 shows a second embodiment of the present invention using a different arrangement for the clutch units. In this drawing, the parts corresponding to those of the first embodiment are denoted with like numerals without repeating the detailed description thereof. In this embodiment, the slide shaft 1 is internally provided with a pair of pins 32a and 32b. These pins 32a and 32b serve as moveable parts of the clutch units, and are resiliently urged by coil springs 31 in the direction to disengage from the slide blocks 21a and 21b (shown in FIG. 7) which threadably engage the threaded sections 17a and 17b of the rotary shaft 18 in a rotationally fast manner. These pins 32a and 32b are normally disengaged from the corresponding slide blocks 21a and 21b (the disengaged state of the clutch units), but when pushed out by the electromagnetic actuators 15a and 15b, the free ends of the pins 32a and 32b are received in holes 33a and 33b formed in the corresponding slide blocks 21a and 21b so that the slide blocks 21a and 21b may be individually connected to the slide shaft 1 (the engaged state of the clutch units).

Figure 8:
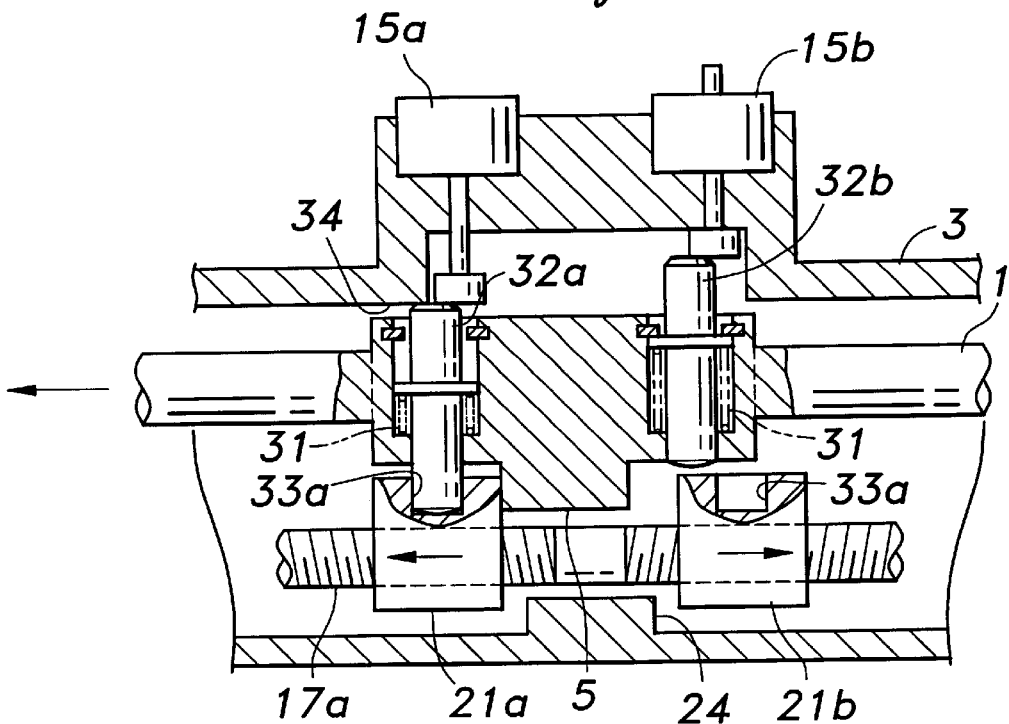
FIG. 8 is a view similar to FIG. 7 showing a mode operation of the device of FIG. 7.

According to this arrangement, by energizing either one of the electromagnetic actuators 15a and 15b (the left electromagnetic actuator, for instance), the free end of the corresponding left pin 32a is pushed into the hole 33a of the left slide block 21a as illustrated in FIG. 8. When the electric motor 20 is turned in the normal direction in this state, the two slide blocks 21a and 21b are moved away from each other by virtue of the threaded sections 17a and 17b of mutually opposite senses of the rotary shaft 18 which they threadably engage with. Because the slide shaft 1 is connected to the left slide block 21a via the left pin 32a, the slide shaft 1 moves leftward as the two slide blocks 21a and 21b move away from each other.

Meanwhile, because the right electromagnetic actuator 15b is de-energized, the right pin 32b would not be fitted into the hole 33b of the right slide block 21b, and the rightward movement of the right slide block 21b would not affect any other part of the system.

The case 3 is internally provided with a guide wall 34 corresponding to the guide groove 14 of the first embodiment. As the slide shaft 1 moves leftward, the upper end surface of the left pin 32a abuts the lower step of the guide wall 34 so that the projected state of the left pin 32a is maintained without relying on the pressure from the left electromagnetic actuator 32a.

When the electric motor 20 is turned in the reverse direction, the two slide blocks 21a and 21b move toward each other, and this causes the slide shaft 1 to move rightward toward the neutral position.

When it is desired to move the slide shaft 1 rightward from the neutral position, the right electromagnetic actuator 15b is energized instead to fit the right pin 32b into the hole 33b of the right slide block 21b.

In the neutral position, the two electromagnetic actuators 15a and 15b are both de-energized, and the right and left pins 32a and 32b are both disengaged from the slide blocks 21a and 21b (the disengaged state of the clutch units) as shown in FIG. 7 so that the positions of the two pins 32a and 32b are defined by the interference of the upper ends of the pins 32a and 32b with the corresponding shoulders of the guide wall 34. As a result, even when the electric motor 20 is inadvertently activated, and the two slide blocks 21a and 21b have moved, the axial movement of the slide shaft 1 is mechanically prohibited.

At the same time as interposing the radial projection 5 of the slide shaft 1 between the two slide blocks 21a and 21b, the stopper portion 24 of the casing 3 is also interposed so that the neutral position is firmly maintained in a similar manner as the first embodiment.

Figure 9:
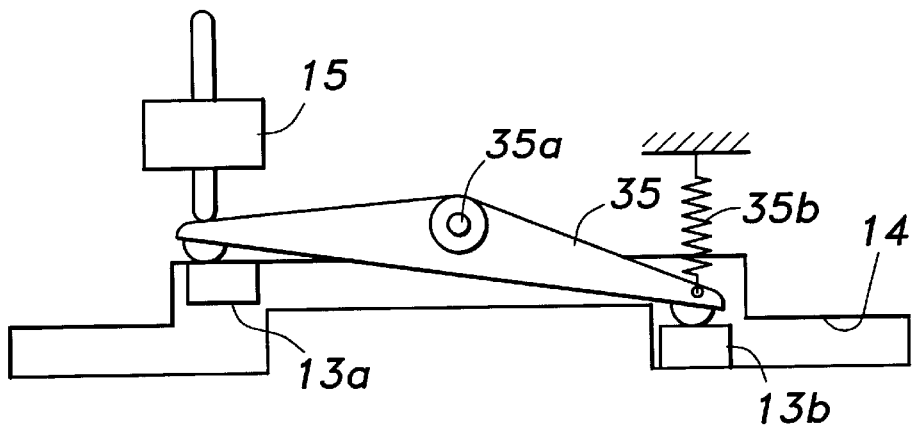
FIG. 9 simplified side view of an alternate arrangement of the actuator including a rocker arm.

FIG. 9 shows another embodiment of the rocker arm. This rocker arm 35 consists of a see-saw type rocker arm centrally supported by a pivot shaft 35a. The two ends of the rocker arm 35 respectively engage arms 13a and 13b formed in the left and right clutch units as illustrated in FIG. 1, and the rocker arm 35 is urged by a torsion spring (which is conceptually indicated by numeral 35b in FIGS. 9 and 10) fitted on the pivot shaft 35a so as to keep one of the clutch units on and the other clutch unit off.

Figure 10:
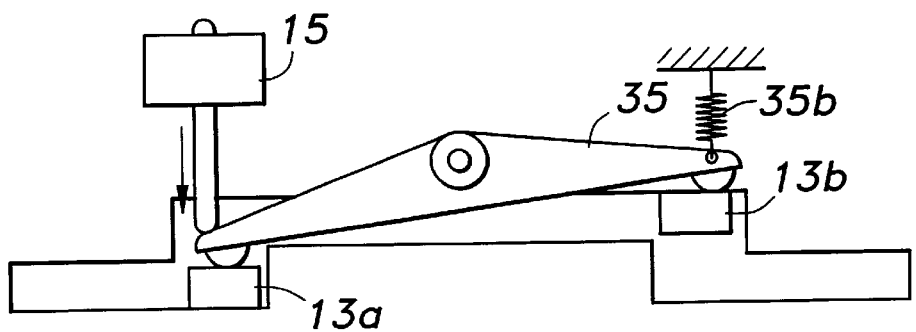
FIG. 10 is a view similar to FIG. 9 showing a different state of the rocker arm of FIG. 9.

According to this arrangement, by pivotally moving the see-saw type rocker arm 35 by energizing the single electromagnetic actuator 15 against the biasing force of the torsion spring, it is possible to turn off the one clutch unit and turn on the other clutch unit instead as illustrated in FIG. 10. This arrangement thus allows simplification of the drive mechanism for the clutch units.

Figure 11:
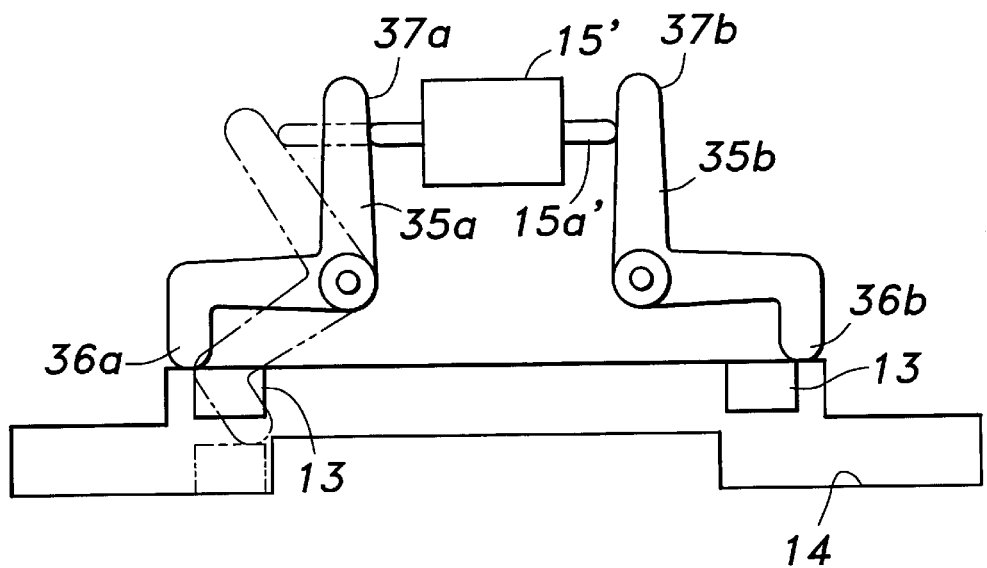
FIG. 11 is a view similar to FIG. 9 showing another alternate arrangement of the actuator including a solenoid having two working ends.

FIG. 11 shows yet another embodiment of the rocker arms. The rocker arms 35a and 35b are each bent into the shape of letter L, and the bent portion thereof is pivotally supported. Each of the rocker arms 35a and 35b has one end 36a or 36b which engages a portion corresponding to the arm 13 of the first embodiment or a portion corresponding to the pins 32a and 32b of the second embodiment. Between the mutually opposing other ends 37a and 37b of the rocker arms 35a and 35b is placed a single electromagnetic actuator 15' having a plunger 15a' which can reciprocate laterally. The rocker arms 35a and 35b are urged toward their respective rest positions by torsion springs or the like.

In this case, the two clutch units are both disengaged in the neutral position, and either one of the rocker arms 35a and 35b turns or either one of the left and right clutch units is engaged depending on the projecting direction of the plunger 15a' of the electromagnetic actuator 15a.

Figure 12:
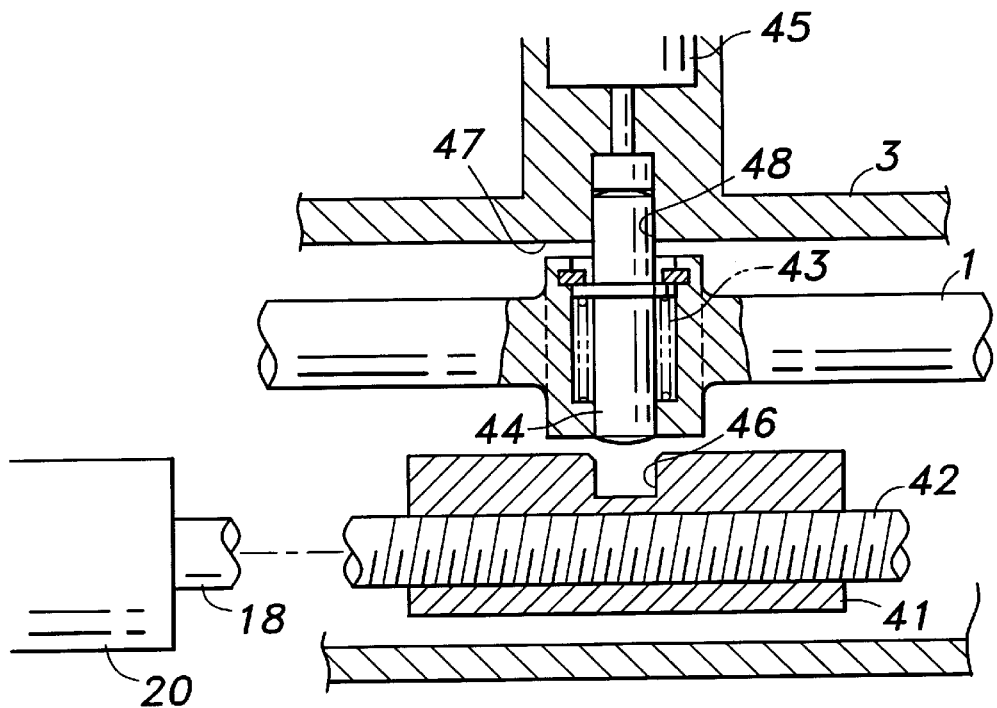
FIG. 12 is a fragmentary sectional view of an essential part of a third embodiment of the present invention.

FIG. 12 shows a third embodiment of the present invention. The slide block 41 shown in FIG. 12 threadably engage, in a rotationally fast manner, a rotary shaft 18 having a single threaded section 42 formed over the entire length thereof so that the slide block 41 can be moved laterally in either direction by driving an electric motor 20 in normal or reverse direction.

Figure 13:
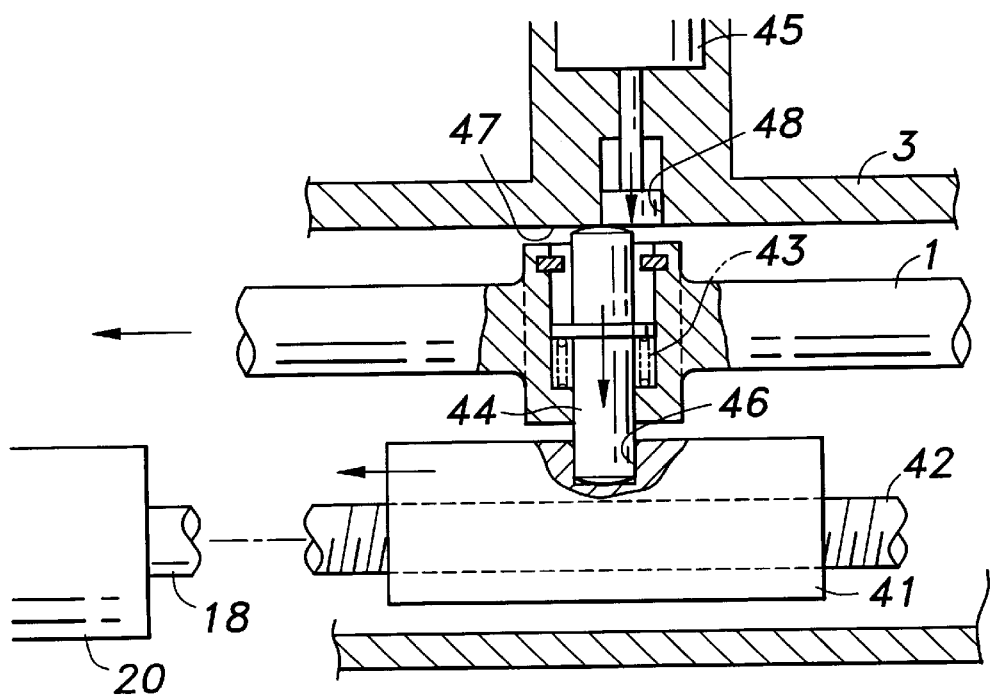
FIG. 13 is a view similar to FIG. 12 showing a mode operation of the device of FIG. 12.

The slide shaft 1 is internally and centrally provided with a pin 44 serving as a moveable part of clutch units which is resiliently urged by a coil spring 43 in the direction to disengage from the slide block 41 (the state illustrated in FIG. 12). This pin 44 is normally disengaged from the slide block 41 (the disengaged state of the clutch units), but once pushed out by an electromagnetic actuator 45, is fitted into a hole 46 formed in the slide block 41 from a front end thereof (the state illustrated in FIG. 13) so as to couple the slide block 41 with the slide shaft 1 (the engaged state of the clutch units).

In this arrangement when the electric motor 20 is turned in either normal or reverse direction with the electromagnetic actuator 45 energized and the slide block 41 coupled with the slide shaft 1 via the pin 44, the slide block 41 which threadably engage the threaded section 42 of the rotary shaft 18 in a rotationally fast manner moves laterally in either direction by virtue of the action of the threaded engagement.

The casing 3 is internally provided with a guide wall 47 for engaging the upper end surface of the pin 44. As the slide shaft 1 starts moving, the upper end surface of the pin 44 engages the lower surface of the guide wall 47 so that the projected state of the pin 44 is maintained without relying on the pressure from the electromagnetic actuator 45.

When the electric motor 20 is driven in the reverse direction, the slide block 41 moves in the opposite direction, and the slide shaft 1 also moves in the opposite direction.

In the neutral position, the electromagnetic actuator 45 is de-energized to disengage the pin 44 from the slide block 41 as illustrated in FIG. 12 (the disengaged state of the clutch units). This causes the upper end of the pin 44 to be fitted into a hole 48 formed in the casing 3 so as to restrict movement of the pin 44. Therefore, even when the electric motor 20 is inadvertently driven and the slide block 41 is moved as a result, the axial movement of the slide shaft 1 is mechanically prohibited.

The moveable part of the clutch units is not limited to the pin 44 which is fitted into the hole 46 of the slide block 41 as described above. For instance, it may consist of a bifurcated fork member which interposes the slide block 41 from both axial ends.

Figure 14:
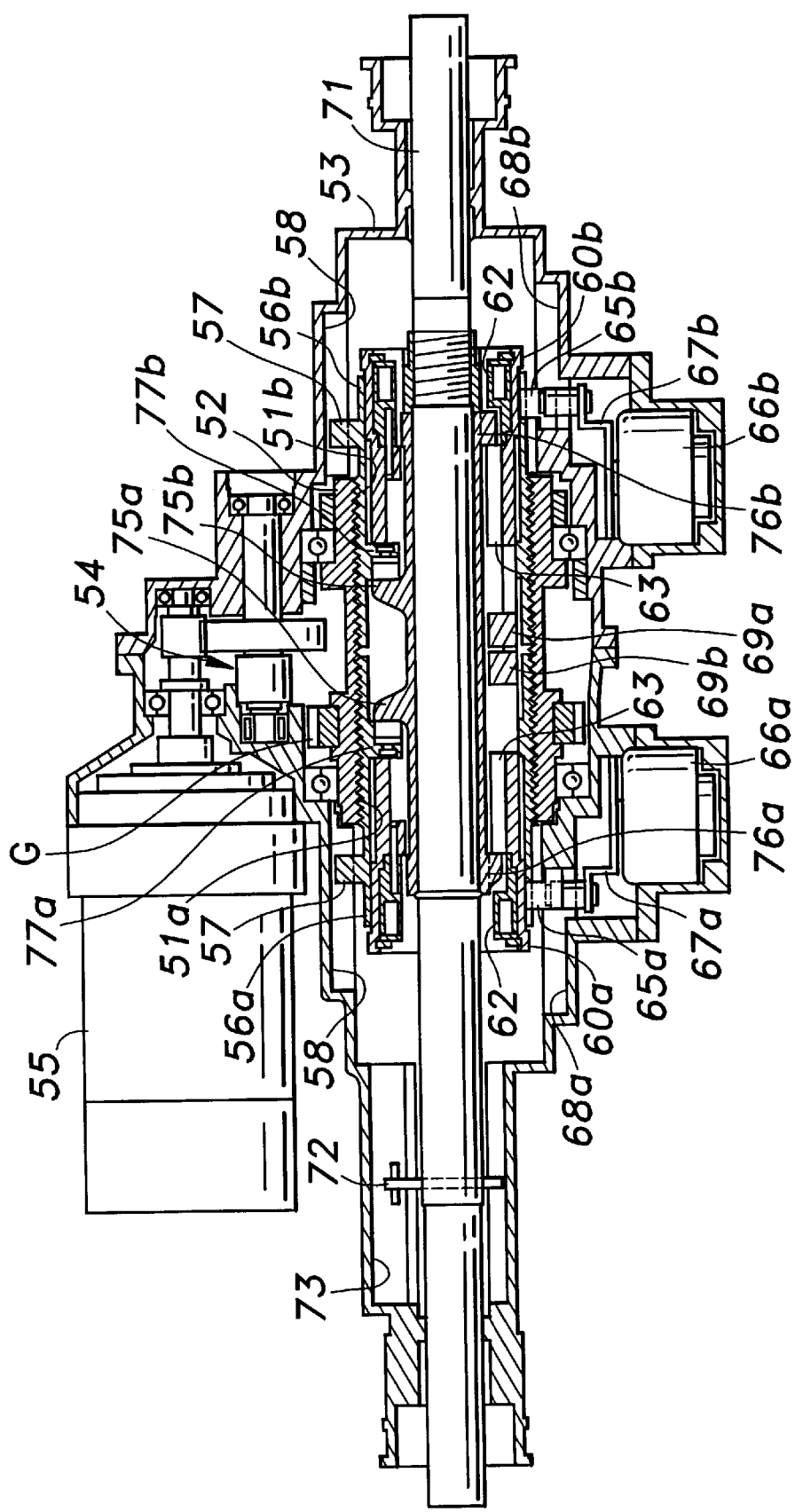
FIG. 14 is a sectional view of a fourth embodiment of the rear wheel steering device according to the present invention.

FIG. 14 generally illustrates the overall structure of a fourth embodiment of the rear wheel steering device according to the present invention. Referring to FIG. 14, a female thread cylinder 52 which is provided with a pair of female threaded sections 51a and 51b of mutually opposite senses on either side of a central part thereof is supported in a casing 53 so as to be axially fast but rotationally free. An external gear G is provided in a suitable part of this female thread cylinder 52 for transmitting the rotational power of an electric motor 55 thereto via a speed reduction gear unit 54 which is only partly shown in the drawing.

Figure 16:
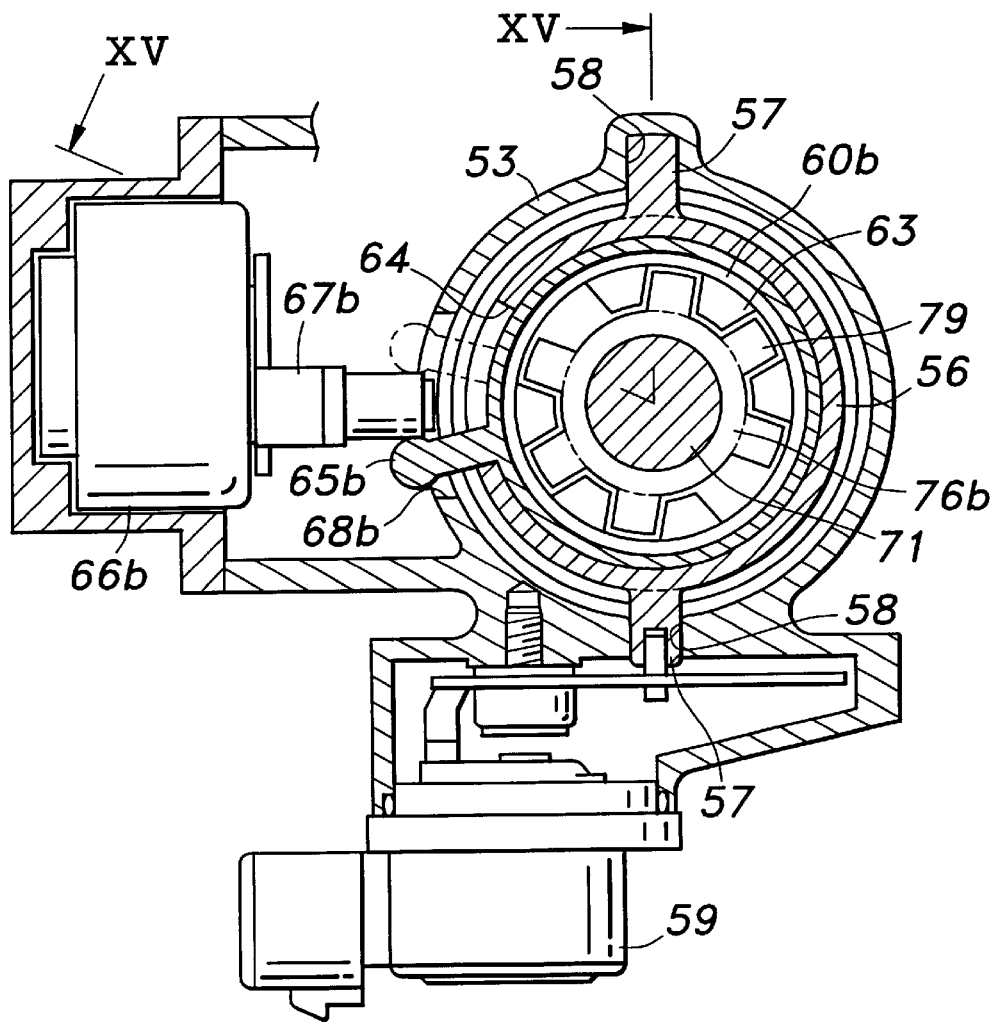
FIG. 16 is a sectional view taken along line XVI—XVI of FIG. 15.

The female threaded sections 51a and 51b of the female cylinder 52 threadably engage left and right slide sleeves (slide members) 56a and 56b, respectively, which are generally cylindrical in shape and provided with male threaded sections on their outer circumferences. These slide sleeves 56a and 56b are each provided with a pair of radial projections 57 projecting outwardly in diametrically opposed directions from a part of the corresponding slide sleeve which extends out of a corresponding axial end of the female thread cylinder 52 when the slide sleeves 56a and 56b are fully threaded into the female thread cylinder 52. These projections 57 are received in corresponding axial grooves 58 formed in the casing 53 to keep the slide sleeves 56a and 56b rotationally fast with respect to the casing 53. One of the projections 57 of each of the slide sleeves 56a and 56b engages a stroke sensor 59 for detecting the displacement of the corresponding slide sleeve 56a or 56b (see FIG. 16).

Figure 15:
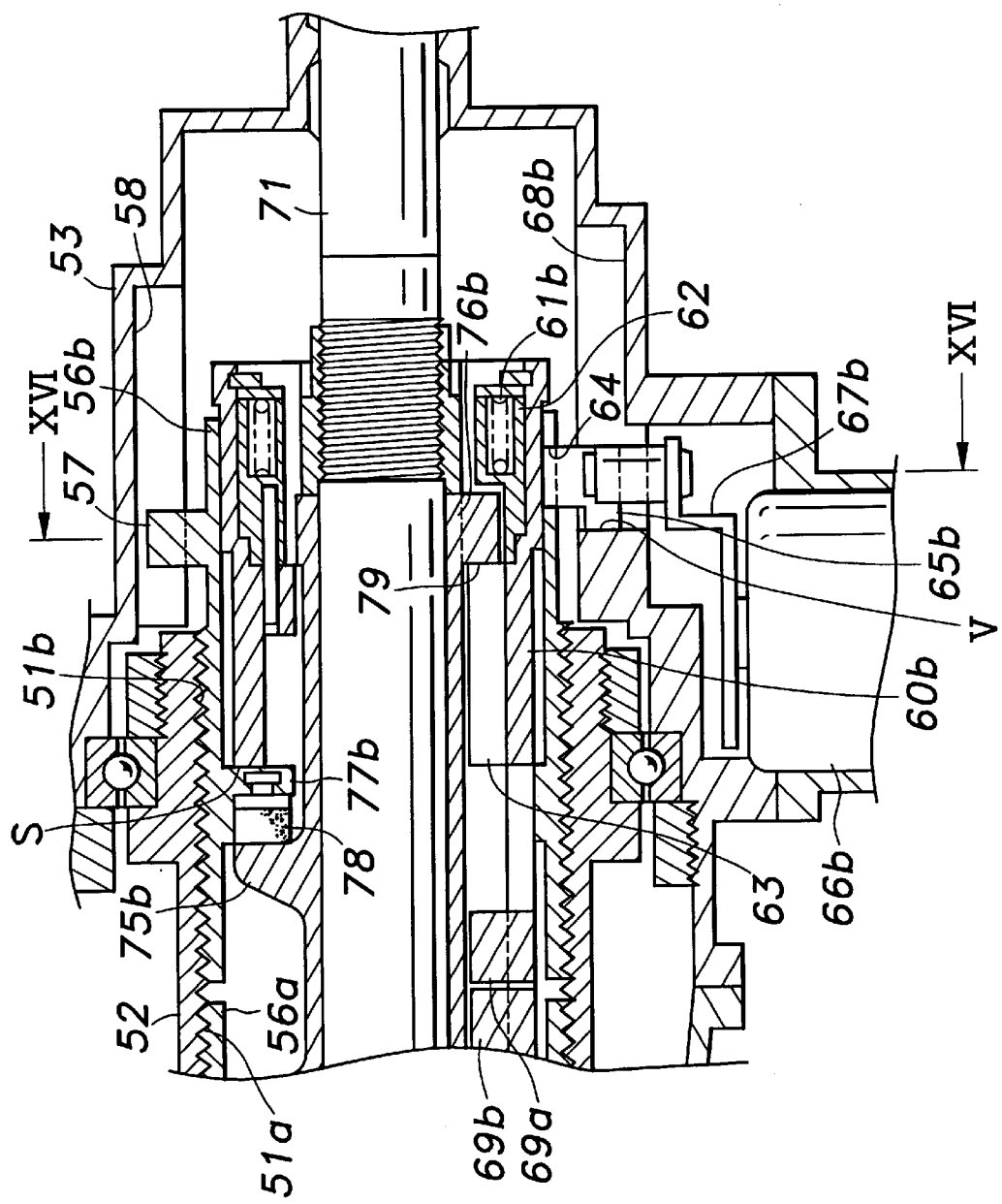
FIG. 15 is an enlarged fragmentary sectional view taken along line XV—XV of FIG. 16.

The inner circumferential surface of each of the left and right slide sleeves 56a and 56b receives a cylindrical clutch outer 60a or 60b (the moveable part of the clutch units) so as to be relatively rotatable over a prescribed angle but axially fast. The outer open end of each of the clutch outers 60a and 60b is fitted with a torsion spring 61a or 61b (shown in FIG. 15, but omitted in FIG. 14) via a spring holder 62 which is fixedly attached to the corresponding clutch outer 60a or 60b, one end of each torsion spring 61a or 61b being engaged by the corresponding slide sleeve 56a or 56b while the other end is engaged by the corresponding clutch outer 60a or 60b.

By virtue of these torsion springs 61a and 61b, the clutch outers 60a and 60b are normally resiliently urged in a prescribed angular direction with respect to the corresponding slide sleeves 56a and 56b. The angular directions of the biasing forces of these springs 61a and 61b are opposite from each other in such a manner that each of them is clockwise as seen from the corresponding axial end of the slide shaft 71.

A part of the inner periphery of each of the clutch outers 60a and 60b which is displaced somewhat inwardly away from the torsion coil mounting portion is provided with a plurality (six in the illustrated embodiment) of radially inwardly directed projections 63, thereby presenting the shape of an internal gear as seen in a cross section perpendicular to the axial line. Each of the projections 63 has a trapezoidal shape as seen in a cross section perpendicular to the axial line of the clutch outers 60a and 60b.

Figure 17:
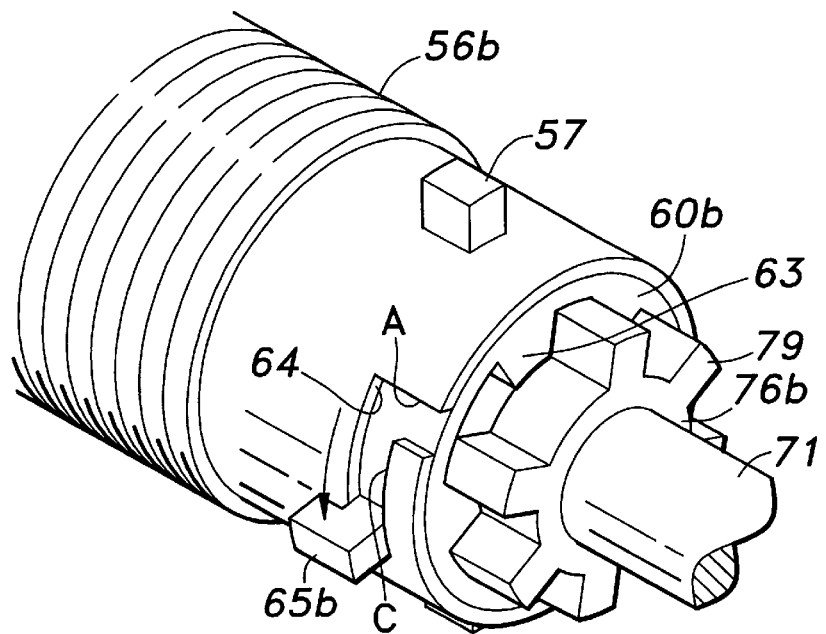
FIG. 17 is a fragmentary perspective view of the clutch unit in its disengaged state.
Figure 18:
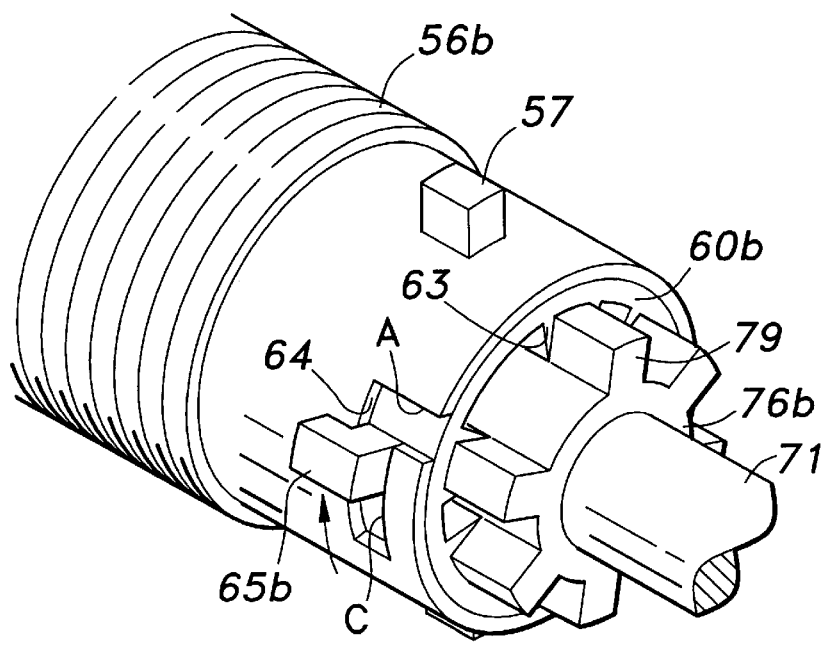
FIG. 18 is a view similar to FIG. 17 showing the clutch unit in its engaged state.
Figure 20:
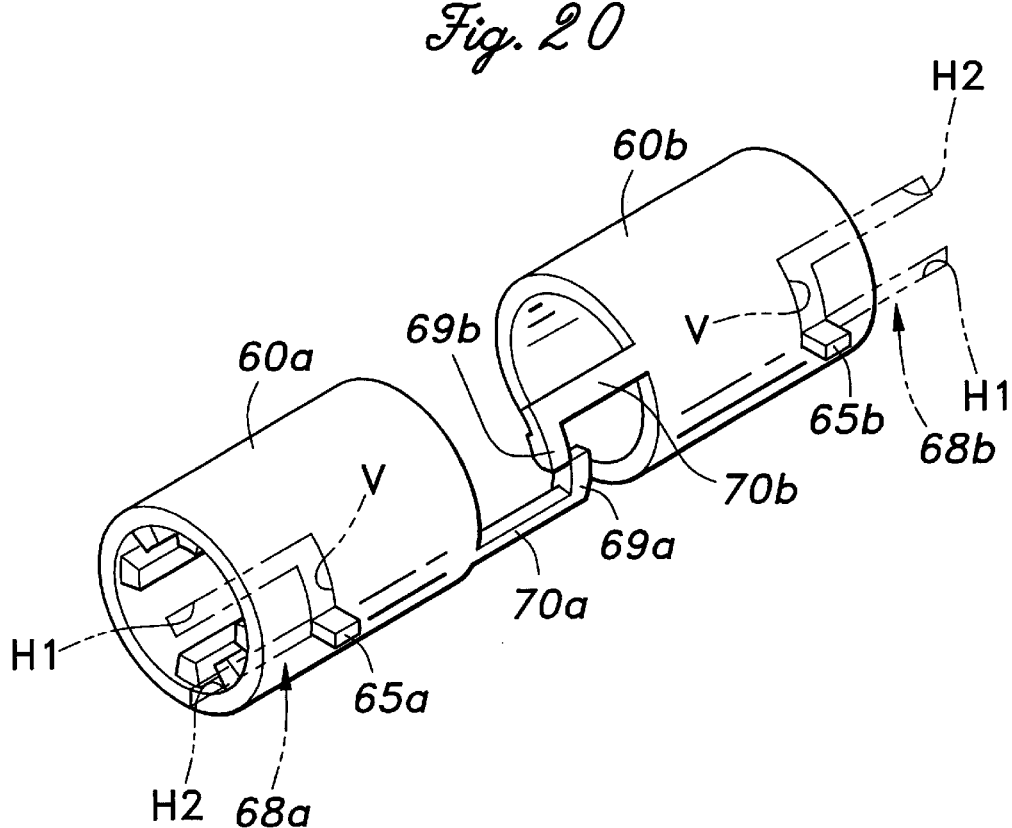
FIG. 20 is a simplified perspective view of the clutch units when the slide shaft is about to move rightward from the neutral position.
Figure 21:
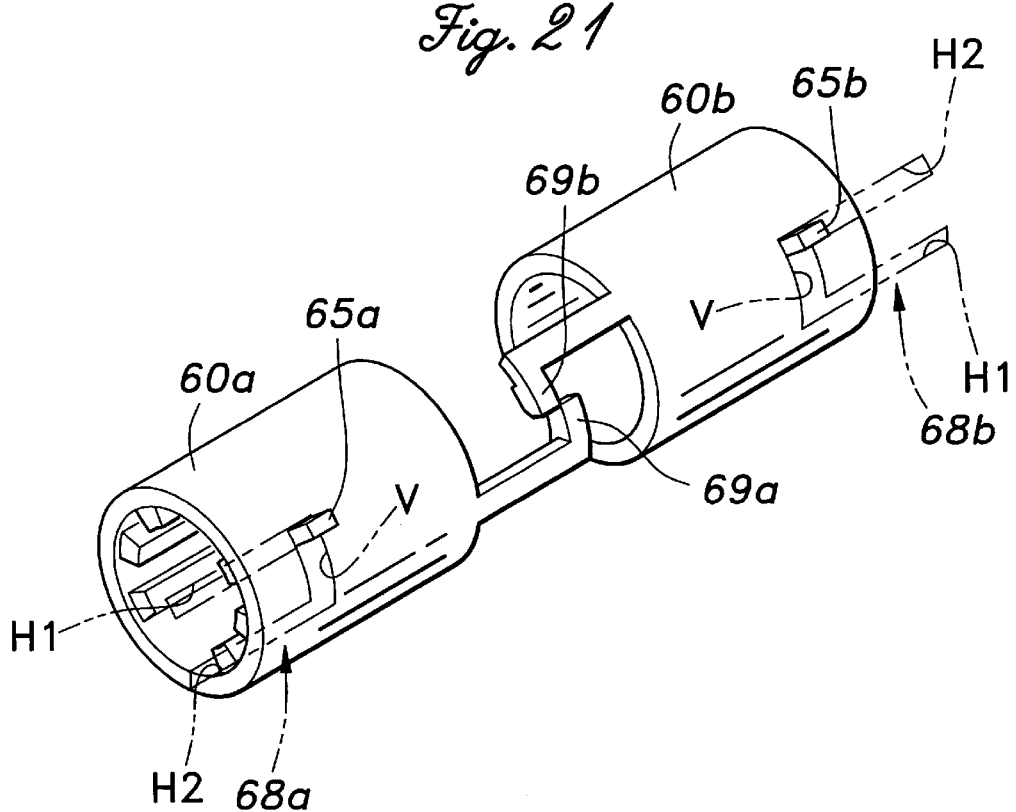
FIG. 21 is a view similar to FIG. 20 showing the clutch units when the slide shaft is about to move leftward from the neutral position.
Figure 22:
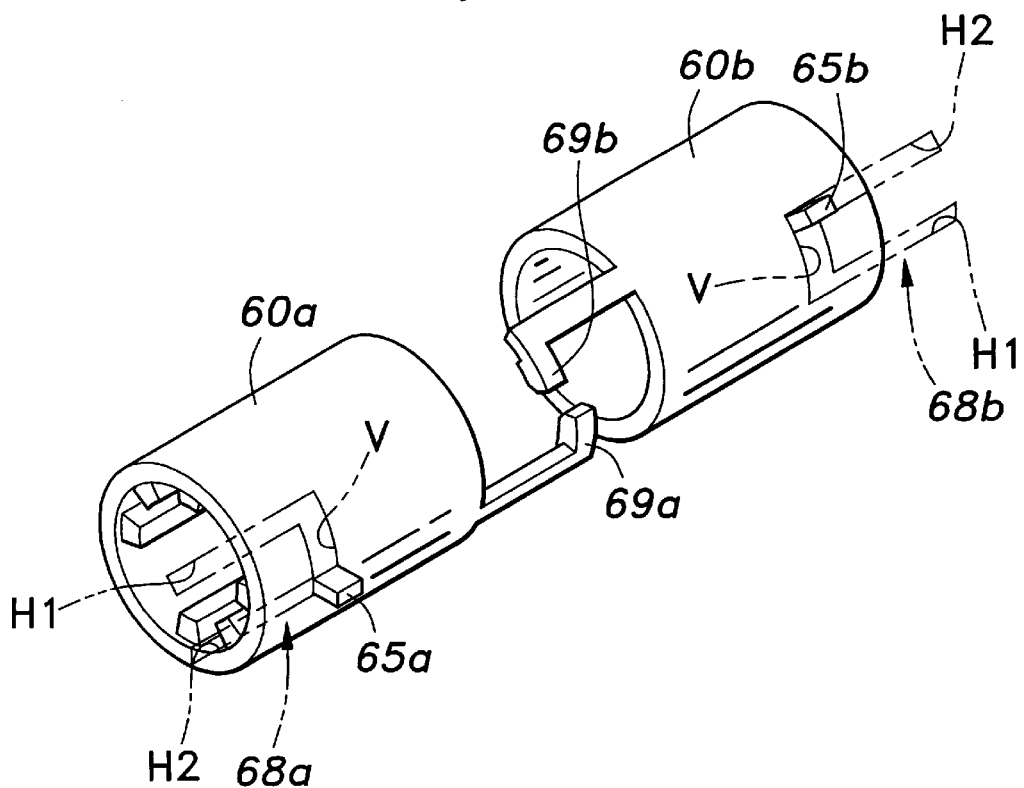
FIG. 22 is a view similar to FIG. 20 showing the clutch units when they have both become unable to disengage, and have thus frozen in their engaged state.
Figure 23:
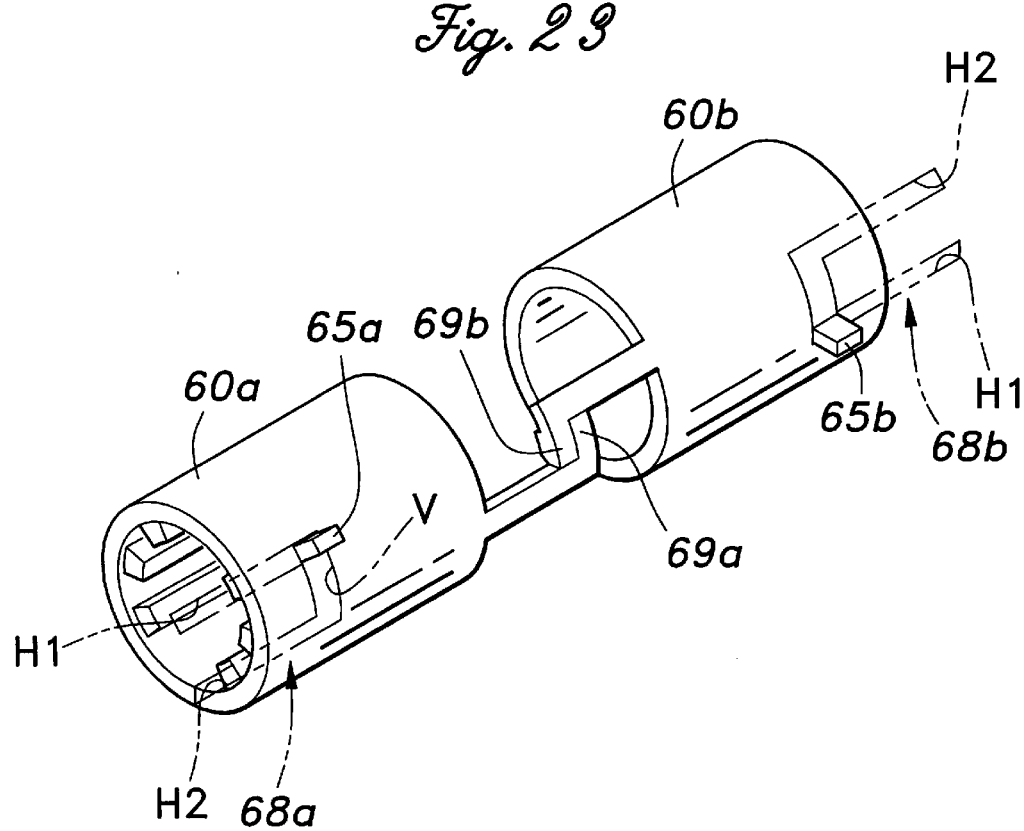
FIG. 23 is a view similar to FIG. 20 showing the clutch units when they have both become unable to engage, and have thus frozen in their disengaged state.

The axial outer end of each of the clutch outers 60a and 60b is provided with an arm 65a or 65b which is passed radially outward through an L-shaped slot 64 formed in the corresponding slide sleeve 56a or 56b (see FIGS. 17 and 18). Each of the L-shaped slots 64 includes an axial segment A which opens out toward the axial end of the corresponding slide sleeve 56a or 56b and a circumferential segment C which corresponds to the rotational angle of the corresponding clutch outer 60a or 60b so that the clutch outers 60a and 60b may not move with respect to the slide sleeves 56a and 56b in the axial direction over the operating angular range of the clutch units, and the arms 65a and 65b may be passed outward through the corresponding slots 64.

Each of the arms 65a and 65b is engaged by a drive arm 67a or 67b of a corresponding rotary actuator 66a or 66b for turning the corresponding clutch outer 60a or 60b against the biasing force of the corresponding torsion spring 61a or 61b. The drive directions of the rotary actuators 66a and 66b are opposite from each other so as to oppose the biasing directions of the corresponding torsion springs 61a and 61b.

The arms 65a and 65b are also engaged in guide grooves 68a and 68b, respectively, formed on the inner surface of the casing 53. The function of these guide grooves 68a and 68b is described hereinafter.

The axially inner ends of the clutch outers 60a and 60b are provided with interlock projections 69a and 69b which can engage and disengaged with and from each other depending on the operating conditions of the clutch units or the relative rotational angle of the two clutch outers 60a and 60b.

Figure 19:
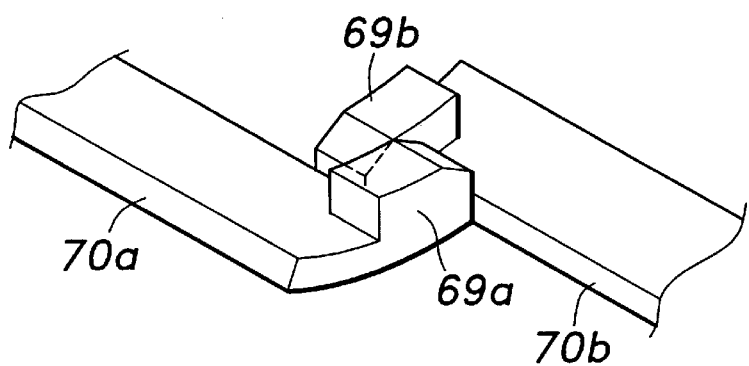
FIG. 19 is a fragmentary perspective view of the interlock projections in their engaged state.

The interlock projections 60a and 60b are formed so as to oppose each other on terminal ends of leg portions 70a and 70b which are formed as extensions of axially inner ends of the outer walls of the cylindrical clutch outers 60a and 60b as illustrated in FIG. 19. If the rotary shaft 52 is turned without engaging either of the clutch units, the slide sleeve 56a or 56b will be axially moved apart, and the position of the slide shaft 71 will become indeterminate. These interlock projections 69a and 69b may consist of a pair or may consist of a plurality of pairs arranged along the circumference at a regular interval.

A common slide shaft 71 is passed through the two clutch outers 60a and 60b. The slide shaft 71 is supported by the casing 53 in an axially slidable manner, and the two ends thereof are connected to the knuckle arms of the rear wheels via tie rods (not shown in the drawings). The slide shaft 71 is prevented from rotation by pins 72 which projects radially in an axially left end portion thereof and is received in an axial groove 73 formed in the casing 53. The upper end of the pin 72 engages a stroke sensor (not shown in the drawings), similar to the stroke sensor 59 shown in FIG. 16, for detecting the displacement of the slide shaft 71.

An axially central part of the slide shaft 71 is provided with a pair of centering projections 75a and 75b which project radially at a certain axial distance from each other. The slide shaft 71 is also provided with a pair of clutch inners 76a and 76b (fixed parts of the clutch units) at a certain distance outwardly from the corresponding centering projections 75a and 75b.

The inner periphery of each of the left and right slide sleeves 56a and 56b is provided with a radially inwardly directed projection 77a or 77b which engages the axially outer end surface of the corresponding centering projection 75a or 75b at its inner end surface when the slide sleeve is fully threaded into the corresponding threaded section 51a and 51b of the female thread cylinder 52 and always engages the axially inner end surface of the corresponding clutch outer 60a or 60b at its outer end surface. The contact surfaces of the radially inwardly directed projections 77a and 77b for the centering projections 75a and 75b are fitted with cushion members 78 made of rubber-like material to prevent the generation of sound upon collision of these projections.

The outer periphery of each of the clutch inners 76a and 76b is provided with a plurality (six in this embodiment) of radial projections 79 (so that this part has the shape of an external gear as seen in the cross section perpendicular to the axial line). Each of the projections 79 is rectangular in shape as seen in the cross section perpendicular to the axial line of the clutch inners 76a and 76b. These projections 79 are so dimensioned that they fit into the recesses defined between adjacent projections 63 of the clutch outers 60a and 60b each having the trapezoidal cross section.

When the rectangular projections 79 of each of the clutch inners 76a and 76b are out of phase with respect to the trapezoidal projections 63 of the corresponding clutch outer 60a or 60b (see FIGS. 16 and 17), the corresponding clutch unit is disengaged. In this state, the corresponding clutch outer 60a or 60b which is integral with the corresponding slide sleeve 56a or 56b is axially moveable relative to the corresponding clutch inner 76a or 76b which is integral with the slide shaft 71.

Conversely, when the rectangular projections 79 of each of the clutch inners 76a and 76b are in phase with respect to the trapezoidal projections 63 of the corresponding clutch outer 60a or 60b (see FIG. 18), or when the corresponding clutch unit is engaged, the corresponding clutch outer 60a or 60b which is integral with the corresponding slide sleeve 56a or 56b is axially fast relative to the corresponding clutch inner 76a or 76b which is integral with the slide shaft 71.

When the electric motor 55 is turned in the normal direction with the left and right slide sleeves 56a and 56b both brought close to the center or brought close to each other, the female thread cylinder 52 turns in the normal direction. Because the slide sleeves 56a and 56b which thread with the female threaded sections 51a and 51b of mutually opposed senses are rotationally fast with respect to the casing 53, they move along the slide shaft 71 away from each other. At this time, because the inwardly directed projections 77a and 77b of the slide sleeves 56a and 56b push the axially inner end surfaces S of the corresponding clutch outers 60a and 60b, the clutch outers 60a and 60b also move away from each other similarly as the slide sleeves 56a and 56b.

Conversely, when the electric motor 55 is turned in the reverse direction with the left and right slide sleeves 56a and 56b both displaced outward or placed remote from each other, the slide sleeves 56a and 56b move along the slide shaft 71 toward the center or toward each other. At this time, because the arms 65a and 65b of the clutch outers 60a and 60b are engaged in the circumferential segments C of the L-shaped slots 64 of the corresponding slide sleeves 56a and 56b, the clutch outers 60a and 60b also move toward each other as well as the slide sleeves 56a and 56b.

The guide grooves 68a and 68b formed on the inner surface of the casing 53 for engaging the arms 65a and 65b are each provided with a pair of axial segments H1 and H2 extending in parallel with each other, and a circumferential segment V connecting the ends of the axial segments facing the axially central part so as to define a rectangular C-shape, and are formed symmetric to each other with respect to the axial center, as shown in FIGS. 20 to 23.

The two clutch outers 60a and 60b are adapted to be angularly actuated individually by the separate rotary actuators 66a and 66b. The clutch units are engaged when the rotary actuators 66a and 66b are not operating, and are engaged when the rotary actuators 66a and 66b are operating.

For instance, when only the right rotary actuator 66b (as seen in FIG. 14) is operated with the slide sleeves 56a and 56b and the clutch outers 60a and 60b brought fully close to the center, only the right clutch outer 60b turns against the biasing force of the torsion spring 61b. As a result, the projections 63 of the corresponding clutch outer 60b are placed out of phase with respect to the projections 79 of the corresponding clutch inner 76a, or the right clutch unit is disengaged (see FIG. 17). At this time, the arm 65b which has downwardly moved along the circumferential segment V of the guide groove 68b aligns with the lower axial segment H1 of the guide groove 68b (see FIG. 20).

Figure 24:
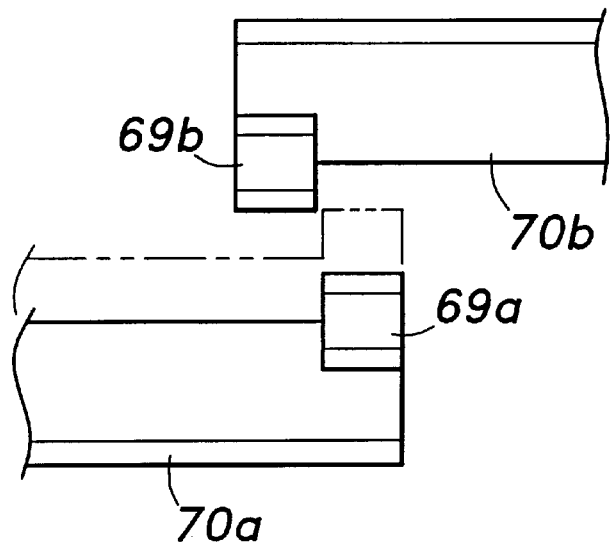
FIG. 24 is a fragmentary perspective view showing a mode of operation of the interlock projections.

At this time, the interlock projections 69a and 69b formed on the axially inner ends of the clutch outers 60a and 60b are disengaged from each other (as indicated by the double-dot chain-dot lines of FIG. 24).

When the electric motor 55 is driven in the normal direction under this condition, the two slide sleeves 56a and 56b which thread with the female thread cylinder 52 move away from each other owing to the threaded sections of opposite senses, and this in turn causes the two clutch outers 60a and 60b to move away from each other. Because the left clutch unit is in the engaged state, the leftward axial force acting on the left slide sleeve 56a is transmitted to the slide shaft 71 via the left clutch outer 60a and the left clutch inner 76a.

At this time, because the projections 63 of the right clutch outer 60b and the projections 79 of the right clutch inner 76b are out of phase, or because the right clutch unit is disengaged, the rightward movement of the right clutch outer 60b along with the right slide sleeve 56b would not affect the right clutch inner 76b or the slide shaft 71 in any way. Thus, the slide shaft 71 moves leftward along with the left clutch outer 60a.

When the slide shaft 71 starts moving leftward, and the arm 65b of the right clutch outer 60b enters the lower axial segment H1 of the guide groove 68b, the right clutch outer 60b becomes incapable of turning. Therefore, at this point, even when the right rotary actuator 66b is de-energized, the disengaged state of the right clutch unit is maintained, and the leftward axial force acting on the slide shaft 71 continues to be transmitted.

Once the axial movement of the slide shaft 71 is mechanically restricted by the arms 65a and 65b of the clutch outers 60a and 60b reaching the outer ends of the lower axial segments H1 of the guide grooves 68b or the projections 57 of the slide sleeves 56a and 56b abutting the outer ends of the corresponding axial grooves 58, the electric current to the electric motor 55 increases, and this may be detected as a signal for discontinuing the supply of electric current to the electric motor 55.

By selecting the lead angle of the threaded sections smaller than the friction angle, the steering angle at the time when the electric motor 55 previously stopped can be maintained.

If the electric motor 55 is reversed from this state, the two slide sleeves 56a and 56b move toward each other or toward the center so that the slide shaft 71 is moved rightward back toward the center by virtue of the engagement between the inward projection 77a of the left slide sleeve 56a and the centering projection 75a of the slide shaft 71. In this case also, because the right clutch unit is disengaged, the leftward movement of the right slide sleeve 56b toward the center would not affect the right clutch inner 76b or the slide shaft 71 in any way.

If the rotary torque of the right rotary actuator 66b is removed when the arm 65b of the right clutch outer 60b is aligned with the circumferential segment V of the right guide groove 68b in the neutral position, the right clutch outer 60b turns under the biasing force of the torsion spring 61b so that the projections 63 of the right clutch outer 60b are brought in phase with the projections 79 of the right clutch inner 76b, or the right clutch unit is engaged.

When the slide shaft 71 is at the neutral position, the inward projections 77a and 77b of the two slide sleeves 56a and 56b hold the centering projections 75a and 75b between them while the arms 65a and 65b of the clutch outers 60a and 60b are engaged and restrained by the inner surface of the circumferential segments V of the guide grooves 68a and 68b on the inner surface of the casing 53. Therefore, combined with the frictional force produced between the female thread cylinder 52 and the two slide sleeves 56a and 56b, the neutral position of the slide shaft 71 is firmly retained even when the slide shaft 71 is subjected to an axial force at the neutral position.

When the slide shaft 71 is desired to be moved rightward beyond the neutral position, only the left rotary actuator 66a is activated, and the electric motor 55 is turned in the normal direction. Because the left clutch unit is disengaged and the right clutch unit is engaged as opposed to the previous case, the rightward axial force acting on the right slide sleeve 56b is transmitted to the slide shaft 71 via the right clutch outer 60b and the right clutch inner 76b whereas the leftward movement of the left slide sleeve 56a would not affect the slide shaft 71 in any way. Also, at this time, the arms 65a and 65b are both aligned with the upper axial segments H1 of the guide grooves 68a and 68b (see FIG. 21), and the interlock projections 69a and 69b of the clutch outers 60a and 60b are disengaged from each other (see the double-dot chain-dot lines of FIG. 24).

Thus, the steering direction is determined by selectively activating either one of the rotary actuators 66a and 66b, and the steering angle is increased by turning the electric motor 55 in the normal direction. When the electric motor 55 is turned in the reverse direction, the slide shaft 71 is always brought back to the neutral position without regard to the current steering direction. Therefore, the determination of the steering direction is not required in the control for restoring the neutral position. Furthermore, once the neutral position is attained, the centering projections 75a and 75b of the slide shaft 71 are held between the inward projections 77a and 77b of the slide sleeves 56a and 56b so that the slide shaft 71 is held firmly stationary. Therefore, the electric current to the electric motor 55 may be discontinued simply by detecting an overload condition, and no sensor is required for detecting the neutral state of the steering device.

This device is equipped with a stroke sensor (not shown in the drawing) which engages the pin 72 to detect the lateral motion of the slide shaft 71, and another stroke sensor 59 which detects the relative displacement of the slide sleeves 56a and 56b. An abnormal state of the device can be determined according to the outputs from these sensors. Now the mode of detecting abnormal conditions in this embodiment is described in the following.

For instance, when only one of the clutch units has frozen, it may be possible to steer in one direction. But, when the other clutch unit is engaged to increase the steering angle in the opposite direction, both of the clutch units are engaged (see FIG. 22). If the electric motor 55 is turned in either direction with both the clutch units engaged, forces that tend to move the two slide sleeves 56a and 56b apart are simultaneously applied to the slide shaft 71, and the slide shaft 71 is therefore incapable of moving in either direction. When both of the clutch units have frozen, it obviously becomes impossible to steer in either direction. Therefore, by monitoring the electric current to the electric motor and the steering angle, it is possible to determine the failure of either one of the clutch units to disengage due to the freezing of the clutch unit.

When both of the clutch units have become unable to engage, because the interlock projections 69a and 69b of the slide sleeves 56a and 56b engage each other, and the relative movement between the slide sleeves 56a and 56b is prevented so that the slide shaft 71 cannot be moved in either direction. In other words, because the slide shaft 71 cannot move in either direction, by comparing the outputs of the first and second sensors when steered in either direction, it is possible to determine the state of the failure of the clutch units to engage. When only one of the clutch units has failed to engage, because the steering angle can be increased in one direction but not in the opposite direction, it is possible to detect the failure by comparing the outputs of the first and second sensors when steered to both directions.

Thus, the failures of the clutch units to engage and disengage can be detected from the steering condition without requiring sensors for monitoring the operation of the rotary actuators 66a and 66b, and the arrangement for detecting an abnormal condition can be simplified.

The interlock projections 69a and 69b prevent the two clutch outers 60a and 60b to move axially away from each other depending on the relative angle between the two clutch outers 60a and 60b, but disengage them from each other when the two clutch outers 60a and 60b are turned in the opposite directions. Thus, these interlock projections 69a and 69b can maintain the clutch outers 60a and 60b firmly in the neutral position if neither of the clutch units is engaged. This is beneficial in preventing any undesired consequences from taking place when the electric motor is turned with both the clutch units disengaged, typically, due to the failure of either one of the clutch units although it is intended to be engaged.

Figure 25:
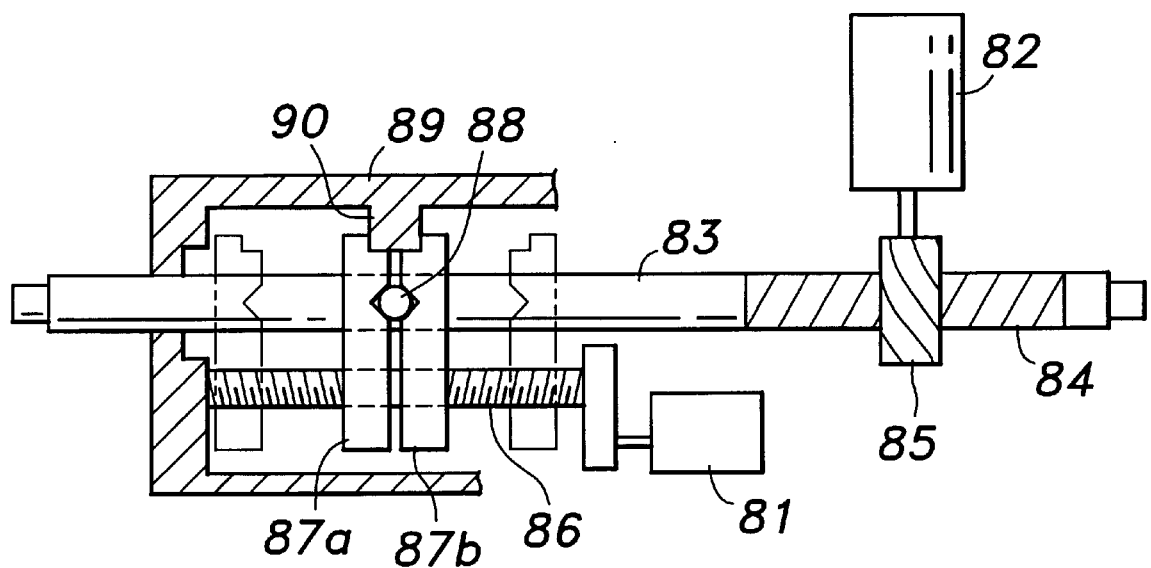
FIG. 25 is a sectional view of a fifth embodiment of the rear wheel steering device according to the present invention.

A fifth embodiment of the present invention is shown in FIG. 25. According to the fifth embodiment, a return drive electric motor 81 for restoring the neutral position and a steering drive electric motor 82 for increasing the steering angle are separately provided. The steering is achieved through the meshing of a rack 84 provided on the slide shaft 83 and a pinion 85 which is driven by the electric motor 82. The restoration of the neutral position is achieved by a pair of slide blocks 87a and 87b which thread with threaded sections of a rotary shaft 86 having opposite senses similarly as the first embodiment. In this case, the two slide blocks 87a and 87b are spaced apart from each other (as indicated by the double-dot chain dot line) so as not to obstruct the axial movement of the slide shaft 83 under normal operating condition, and the two slide blocks 87a and 87b are brought close to each other by driving the rotary shaft 86 with the return drive electric motor 81 when the neutral position is required to be regained, for instance, in emergency. As the two slide blocks 87a and 87b are brought close to each other, they hold a projection 88 formed on the slide shaft 83 between them so that the slide shaft 83 is forced to the neutral position. The two slide blocks 87a and 87b hold a projection 90 of the casing 89 between them at the same time as holding the projection 88 formed on the slide shaft 83 between them so that the neutral position can be firmly retained similarly as the first embodiment.

Thus, according to the various possible features of the present invention, because the steering angle neutral position can be achieved by holding a projection of the slide shaft between a pair of slide blocks which are arranged so as not to interfere with the normal steering operation, the need for a return spring for achieving the steering angle neutral position can be eliminated, and the actuator for the normal steering operation is not opposed by any undesired force. Therefore, the output requirement of the electric motor can be reduced, and this provides a significant contribution in achieving a compact design of the electric motor and the associated drive circuit. Also, because the restoration of the neutral position can be carried out without regard to the current steering angle, h is not necessary to determine in which direction the vehicle is being steered when conducting a control for restoring the neutral position in emergency. Therefore even if the steering sensor or the associated computing unit fails to operate properly, the neutral position can be achieved. Furthermore, the force for retaining the neutral position can be supported by the casing which Is fixedly secured to the vehicle body, and the casing serves as a positional reference for the assembly work, the neutral position can be defined at a high level of positional precision at the time of emergency as well as during the normal operation.

Although the present invention has been described in terms of preferred embodiments thereof, it is obvious to a person skilled in the art that various alterations and modifications are possible without departing from the scope of the present invention which is set forth in the appended claims.

What is claimed is:

1. A rear wheel steering device, comprising:
   a slide shaft supported by a casing so as to be axially slidable;
   a rotary shaft supported by said casing in parallel with said slide shaft so as to be rotatable around its axial line, and provided with a pair of threaded sections of mutually opposite senses;
   an electric motor adapted to turn said rotary shaft in either direction;
   a pair of slide members supported in a rotationally fast manner, and having threaded sections which engage the corresponding threaded sections of said rotary shaft so as to be moveable in mutually opposite axial directions as said rotary shaft is turned in either direction;
   a pair of clutch units each interposed between a corresponding one of the slide members and the slide shaft for selectively coupling them in an axially fast manner; and
   at least one actuator for selectively engaging either one of the clutch units.

2. A rear wheel steering device according to claim 1, wherein said slide shaft is provided with a projection which is adapted to be held between said slide members when said slide members are moved axially toward each other.

3. A rear wheel steering device according to claim 2, wherein said casing comprises a projection which is adapted to be held between said slide members when said slide members are moved axially toward each other, jointly with said projection provided in said slide shaft, so as to firmly define a neutral position for said slide shaft.

4. A rear wheel steering device according to claim 2, wherein each of said slide members comprises a sleeve member fitted onto said slide shaft, and each of said clutch units comprises a clutch inner which is attached to said slide shaft and a clutch outer which is attached to a corresponding one of the slide members so as to be respectively axially fast but relatively rotatable by a prescribed angle, each of said clutch units comprising a spring member which relatively urges said clutch outer and said clutch inner in an angular direction, said actuator being adapted to relatively turn said clutch outer and said clutch inner in an opposite angular direction against a biasing force of said spring member; said clutch outer and said clutch inner being provided with radial projections which selectively allow transmission of an axially outward movement of a corresponding one of the slide members to said slide shaft depending on an angular position of said clutch outer relative to said clutch inner.

5. A rear wheel steering device according to claim 4, wherein said rotary shaft comprises a threaded rod rotatably supported by said casing next to the slide shaft, and having a pair of threaded sections of opposite senses on either side of an axially central part thereof, each of said slide members including a first annular part having an internal thread engaging a corresponding one of the threaded sections of the threaded rod and a second annular part fitted onto said slide shaft with said clutch unit interposed between them.

6. A rear wheel steering device according to claim 5, wherein said clutch inner is rotatable relative to the slide shaft, and provided with an arm which is engaged in a groove formed in said casing, said groove including a pair of axial segments corresponding to positions of said arm when said clutch unit is engaged and disengaged, respectively, which are joined by a circumferential segment connecting adjacent axial ends of said axial segments and corresponding to the neutral position of said slide shaft so that an angular position of said clutch inner may be maintained even in absence of energization of said actuator for the clutch unit once said slide member is moved axially away from the neutral position in a corresponding direction.

7. A rear wheel steering device according to claim 6, wherein said actuator comprises a pair of solenoids each of which acts upon an arm formed on a corresponding one of said clutch inners.

8. A rear wheel steering device according to claim 6, wherein said actuator comprises a single solenoid having a pair of working ends which alternatively acts upon an arm formed on a selected one of said clutch inners.

9. A rear wheel steering device according to claim 6, wherein said actuator comprises a rocker arm having two ends each of which acts upon an arm formed on a corresponding one of said clutch inners, a spring member biasing said rocker arm in an angular direction, and a single solenoid which selectively biases said rocker arm in an opposite angular direction against a spring force of said spring member.

10. A rear wheel steering device according to claim 6, wherein said rotary shaft comprises a threaded rod rotatably supported by said casing next to the slide shaft, and having a pair of threaded sections of opposite senses on either side of an axially central part thereof, each of said slide members including an annular part having an internal thread engaging a corresponding one of the threaded sections of the rotary shaft; and each of said clutch units comprises a hole formed in a corresponding one of said slide members, a pin slidably received in said slide shaft so as to be selectively fitted into said hole of said slide member when said slide shaft and said slide member are at their neutral positions; a spring member which normally resiliently retracts said pin into said slide shaft; and an actuator which can selectively fit said pin into said hole of said slide member against a spring force of said spring member.

11. A rear wheel steering device according to claim 10, wherein said casing is provided with a guide wall which engages each of said pins so as to keep said pin fitted into said hole of the corresponding one of the slide member as said slide shaft is axially driven by said slide member away for its neutral position with said pin fitted into said hole of said slide member.

12. A rear wheel steering device according to claim 1, wherein said rotary shaft comprises a hollow sleeve member having a pair of internal threaded sections of mutually opposite senses on an inner surface thereof in a mutually symmetric relationship with respect to an axial center thereof; and said slide members comprise a pair of slide sleeves each having an external threaded section on an outer circumferential surface thereof which engages a corresponding one of said threaded sections of said rotary shaft in a coaxial relationship;

said slide shaft being coaxially received in said slide sleeves.

13. A rear wheel steering device according to claim 12, wherein each of said slide sleeves comprises a radial projection which is received in an axial groove formed in said casing to keep said slide sleeve rotationally fast with respect to said casing.

14. A rear wheel steering device according to claim 13, wherein each of said clutch units comprises a clutch inner which is fixedly attached to slide shaft and provided with an outwardly extending radial projections, a clutch outer which is attached to a corresponding one of said slide sleeves so as to be axially fast but relatively rotatable by a prescribed angle, and provided with an inwardly extending radial projections which selectively axially align with said projections of said clutch inner so as to engaging said slide shaft axially fast with said slide sleeve depending a relative angle between them, and a spring member which normally urges said clutch outer in one angularly direction; said actuator for said clutch unit being adapted to turn said clutch outer in an opposite angular direction against a spring force of said spring member.

15. A rear wheel steering device according to claim 13, wherein said clutch outer is rotatable relative to said slide shaft, and provided with an arm which is engaged in a groove formed in said casing, said groove including a pair of axial segments corresponding to positions of said arm when said clutch unit is engaged and disengaged, respectively, which are joined by a circumferential segment connecting adjacent axial ends of said axial segments and corresponding to the neutral position of said slide shaft so that an angular position of said clutch inner may be maintained even in absence of energization of said actuator for the clutch unit once said slide sleeve is moved axially away from the neutral position in a corresponding direction.

16. A rear wheel steering device according to claim 15, wherein said actuator comprises a pair of solenoids each of which acts upon an arm formed on a corresponding one of said clutch outers.

17. A rear wheel steering device according to claim 12, wherein said slide sleeves are provided with interlock projections on mutually opposing axial ends thereof so that the slide sleeves may be prevented from being moved axially apart from said neutral position when neither one of said clutch units is engaged.

* * * * *

UNITED STATES PATENT AND TRADEMARK OFFICE
CERTIFICATE OF CORRECTION

PATENT NO. : 6,223,851 B1
DATED : May 1, 2001
INVENTOR(S) : Hiroshi Furumi, Kunio Shirakawa, Yoshio Kakizaki It is certified that error appears in the above-identified patent and that said Letters Patent is hereby corrected as shown below:

Column 3,
Line 39, after "formed" insert -- on --;
Line 45, change "emebodiment" to -- embodiment --;
Lines 45-46, change "arrangements" to -- arrangement --.

Column 4,
Line 28, delete "an";
Line 31, after "depending" insert -- on --;
Line 63, change "failsafe" to -- fail-safe --.

Column 5,
Line 33, after "1" insert a semicolon;
Line 40, after "mode" insert -- of --;
Line 42, after "9" insert -- is a --;
Line 52, after "mode" insert -- of --.

Column 11,
Line number between 40 and 41, change "engage" to -- engages --;
Line 62, change "engage" to -- engages --.

Column 13,
Line 36, change "disengaged" to -- disengage --;
Line 55, change "projects" to -- project --.

Column 18,
Line 20, change "h is not" to -- it is not --;
Line 24, change "which 1s" to -- which is --.

UNITED STATES PATENT AND TRADEMARK OFFICE
CERTIFICATE OF CORRECTION

PATENT NO. : 6,223,851 B1
DATED : May 1, 2001
INVENTOR(S) : Hiroshi Furumi, Kunio Shirakawa, Yoshio Kakizaki It is certified that error appears in the above-identified patent and that said Letters Patent is hereby corrected as shown below:

Column 20, claim 14,
Line 30, before "slide" insert -- a --; delete "an";
Line 34, delete "an";
Line 36, change "engaging" to -- engage --;
Line 37, after "depending" insert -- on --;
Line 39, change "angularly" to -- angular --.

Signed and Sealed this

Nineteenth Day of February, 2002

Attest:

JAMES E. ROGAN
*Attesting Officer*     *Director of the United States Patent and Trademark Office*